(12) United States Patent
Machida et al.

(10) Patent No.: US 8,461,271 B2
(45) Date of Patent: Jun. 11, 2013

(54) GRAFT COPOLYMER, THERMOPLASTIC RESIN COMPOSITION COMPRISING THE GRAFT COPOLYMER, AND THOSE PRODUCTION METHOD

(75) Inventors: Shuji Machida, Chiba (JP); Ryo Aburatani, Chiba (JP); Takenori Fujimura, Chiba (JP); Harumi Nakashima, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 366 days.

(21) Appl. No.: 12/517,078

(22) PCT Filed: Nov. 30, 2007

(86) PCT No.: PCT/JP2007/073213
§ 371 (c)(1),
(2), (4) Date: Jun. 1, 2009

(87) PCT Pub. No.: WO2008/066168
PCT Pub. Date: Jun. 5, 2008

(65) Prior Publication Data
US 2010/0076146 A1 Mar. 25, 2010

(30) Foreign Application Priority Data
Dec. 1, 2006 (JP) .................................. 2006-326128

(51) Int. Cl.
*C08L 51/00* (2006.01)
*C08F 255/00* (2006.01)
*C08F 255/02* (2006.01)
*C08F 263/00* (2006.01)

(52) U.S. Cl.
USPC ............. 525/285; 525/64; 525/240; 525/242; 525/301; 524/528

(58) Field of Classification Search
USPC ............. 525/64, 240, 242, 285, 301; 524/528
See application file for complete search history.

(56) References Cited

U.S. PATENT DOCUMENTS

| | | | |
|---|---|---|---|
| 5,458,845 A * | 10/1995 | Ishii et al. ..................... 264/515 |
| 2003/0017940 A1 | 1/2003 | Kashiwamura et al. |
| 2005/0171295 A1* | 8/2005 | Kanamaru et al. ............ 525/386 |
| 2007/0043192 A1 | 2/2007 | Okamoto et al. |
| 2008/0071048 A1 | 3/2008 | Minami et al. |

OTHER PUBLICATIONS

Office Action as received in the corresponding Japanese Patent Application No. JP2008-539861 dated Mar. 5, 2013.

* cited by examiner

*Primary Examiner* — Mark Kaucher
(74) *Attorney, Agent, or Firm* — Oblon, Spivak, McClelland, Maier & Neustadt, L.L.P.

(57) ABSTRACT

Provided is a production process for a graft copolymer or a thermoplastic resin composition containing the above graft copolymer, which comprises graft-polymerizing 100 parts by mass of a combination of 20 to 100% by mass of a reactive polyolefin and 0 to 80% by mass of a polyolefin other than the reactive polyolefin with 0.2 to 300 parts by mass of at least one specific monomer under the presence of a radical initiator and which is useful as a sealant, a modifier for polyolefins, a surface treating agent, a primer treating agent, a coating agent component and the like.

11 Claims, 1 Drawing Sheet

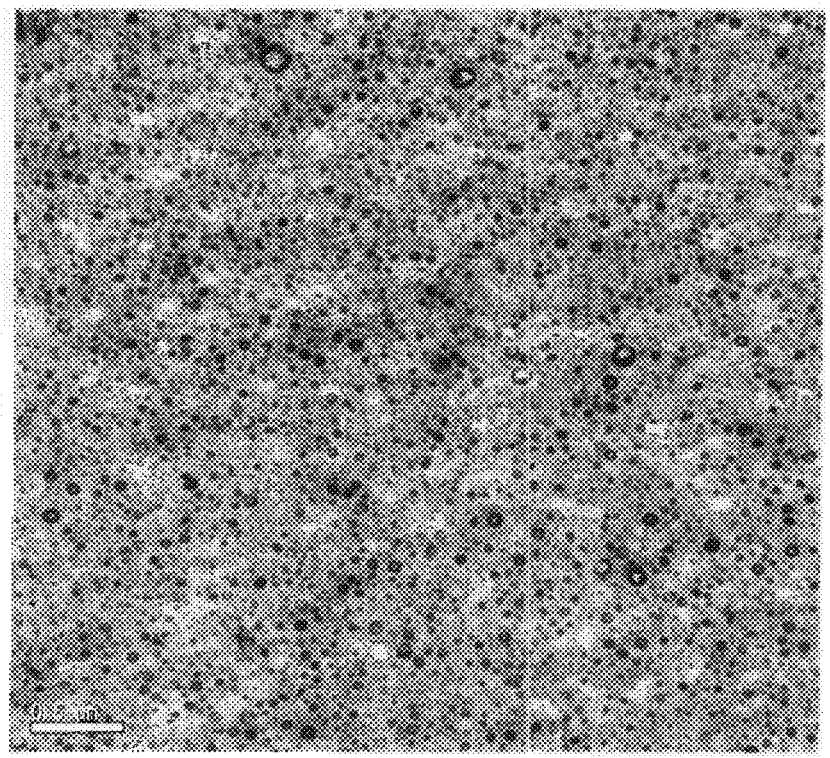

GRAFT COPOLYMER, THERMOPLASTIC RESIN COMPOSITION COMPRISING THE GRAFT COPOLYMER, AND THOSE PRODUCTION METHOD

CROSS-REFERENCE TO RELATED APPLICATIONS

This application is a 371 of PCT/JP07/073213 filed on Nov. 30, 2007 and claims the benefit of JP 2006-326128 filed Dec. 1, 2006.

BACKGROUND OF THE INVENTION

The present invention relates to a production process for a graft copolymer or a thermoplastic resin composition containing the above copolymer, comprising graft-polymerizing a specific reactive polyolefin (or a combination of the above reactive polyolefin and a polyolefin other than the polyolefin) with a specific monomer under the presence of a radical initiator and further relates to a copolymer or a thermoplastic resin composition containing the above copolymer which is obtained by the above production process and a composition prepared by adding a thermoplastic resin and the like to the above copolymer or a thermoplastic resin composition containing the above copolymer.

In the present specification, the reactive polyolefin means a polyolefin which prepares efficiently a graft polymer with a radical initiator, and it shows, to be specific, a polyolefin having 0.5 or more terminal unsaturated group per molecule.

As can be found from the above definition, all molecules contained in the reactive polyolefin do not necessarily have a terminal unsaturated group and do not necessarily have a reactivity. Further, as described above, polymerization reaction is carried out in a certain case by combining with a polyolefin other than the reactive polyolefin. In such case, a composition containing a graft copolymer is obtained depending on a subsequent refining process therefor, and therefore the expression "a graft copolymer or a thermoplastic resin composition containing the graft copolymer" described above is used. The thermoplastic resin composition obtained in the above stage is abbreviated as "the thermoplastic resin composition I".

Other thermoplastic resins are further added in a certain case to the above graft copolymer or the thermoplastic resin composition I depending on uses to prepare a composition, and this is expressed by "a composition prepared by adding a thermoplastic resin and the like to the above copolymer or a thermoplastic resin composition containing the above copolymer" described above. The thermoplastic resin composition obtained in the above stage is abbreviated as "the thermoplastic resin composition II".

RELATED ART

Olefin base polymers prepared by subjecting polyolefins such as polyethylene, polypropylene and the like to graft modification by unsaturated carboxylic acids or acid anhydrides thereof have so far been used as a modifying agent and an adhesion-providing agent for various resins.

The above modifying agents are expected to make it possible to improve further more the performances such as the adhesion, the compatibility and the like by enhancing the graft modification amount and elevate a controllability of the graft structure.

On the other hand, low regular polyolefins obtained by using a metallocene base catalyst are excellent in a flexibility and a miscibility with olefin base resins because of a low regularity thereof, and uses thereof are expected to be further developed to adhesiveness and complexation with different kinds of resins by providing them with polar groups.

A production process for graft polymers of terminal unsaturated polypropylene with acryl base monomers is known (refer to, for example, patent documents 1 and 2).

The above terminal unsaturated polypropylene is a commercial thermally cracked product having a low molecular weight, and it comprises polypropylene having more than one terminal unsaturated group per molecule in a terminal structure.

This is apparent as well from the fact that thermally cracked polypropylene produced by thermal cracking has 1.4 terminal unsaturated group per molecule (refer to, for example, a patent document 3).

Polypropylene having 2 or more unsaturated groups forms an intermolecular cross-linking structure (H type) in polymerizing with an acryl base monomer to produce a gel in a certain case.

Further, in a case where the graft copolymer is provided with a high molecular weight and a case where unsaturated polypropylene as a precursor thereof has a high molecular weight, a frequency of producing a gel is elevated as an unsaturated group per molecule exceeds 1.

Next, the graft polymerization temperature has been set to a range of 150 to 300° C., and this accelerates, in addition to graft reaction, radical addition polymerization of the acryl base monomer to polypropylene and homopolymerization of the instable acryl base monomer. Accordingly, the graft copolymer is likely to be reduced in a structural controllability, and at the same time, the targeted graft copolymer is likely to be reduced in a yield.

A graft copolymer obtained by radically copolymerizing an ethylene copolymer having a terminal unsaturated group with a polar monomer is publicly known (refer to, for example, a patent document 4).

However, as far as a propylene base copolymer is concerned, selection of catalysts which is important for controlling production of a terminal unsaturated group and a polymerization process thereof are not described.

Further, difference from terminal unsaturated group-containing polypropylene obtained by a thermal cracking process is not specifically described as well, and specific matters other than the examples of the terminal unsaturated ethylene copolymers are not found therein.

It is known to react maleic anhydride with a terminal vinylidene group of atactic polypropylene obtained with a metallocene catalyst to produce mainly an addition modified matter (refer to, for example, patent documents 5 and 6).

However, an addition amount of maleic anhydride is as small as 1 to 2 per molecule.

A method in which maleic anhydride and olefin are used to acylate terminal unsaturated isobutylene is publicly known as well (refer to, for example, a patent document 7).

In the above method, a terminal unsaturated group remains, and a modification amount thereof is small. Further, a radical initiator is not used.

Also, a method in which styrene and maleic anhydride are reacted with terminal unsaturated isobutylene under the presence of a radical initiator is publicly known as well (refer to, for example, a patent document 8).

It is specified that in the above method, the presence of styrene increases the modification amount, but the modification amount is not sufficiently large.

Known is a composition comprising a polypropylene polymer and a polar group-containing propylene base polymer in which a propylene chain having a stereoblock structure comprising an isotactic block and an amorphous block is a principal chain and which has a polar part on a side chain (refer to, for example, a patent document 9).

It is described in the patent document 9 that a modifying base material is preferably unsaturated at a terminal and that this allows the graft efficiency to go up. However, an extent and a structure of the terminal unsaturation degree and selection of the modifying agent are not specifically disclosed, and only an example in which polypropylene having a terminal vinylidene group and a terminal vinyl group in small amounts (a vinylidene group: 19.4% and a vinyl group: 6.4%) is modified with maleic anhydride is disclosed in the examples.

Further, a modification amount of 2.1 mol % (4.77 wt %) and a molecular weight Mw of 11000 are described, but the above modification amount has a normal dependency on a molecular weight and is not necessarily high.

Also, it is specified that the above polypropylene composition containing modified polypropylene is excellent in a primerless coating performance. Usually, an acid modification amount in the composition has to be raised in order to exert a good coating performance, and therefore when modified polypropylene in which a modification amount is not high is used, a large amount of the modified polypropylene is required. Accordingly, a large amount of modified polypropylene having a low elastic modulus comes to be added and results in lowering the physical properties of high rigid polypropylene.

An adhesive composition containing an organic acid-modified matter of polyolefin having a low stereoregularity (mmm=20 to 60 mol %) is known (refer to, for example, a patent document 10).

The adhesive composition described in the patent document 10 exhibits an adhesive property, but because of a low modification amount of the organic acid-modified matter of the above polyolefin, an amount of the organic acid-modified matter of the polyolefin in the adhesive composition has to be increased in order to obtain the adhesive composition having a sufficiently high adhesive force. Accordingly, when polypropylene having a high rigidity is used, a reduction in the physical properties such as the elastic modulus thereof and the like is brought about.

Accordingly, a graft copolymer containing no irregular structure such as a cross-linked structure and the like, comprising a wide range of polar monomer species, having a high content of a polar monomer component, comprising a principal chain derived from a side chain polyolefin linkage and a polar monomer and having a high structural controllability or a thermoplastic resin composition containing the above copolymer and a production process for the same are not known.

Patent document 1: Japanese Patent Application Laid-Open No. 165872/2003
Patent document 2: Japanese Patent Application Laid-Open No. 40946/2003
Patent document 3: Japanese Patent Application Laid-Open No. 107442/1994
Patent document 4: Japanese Patent Application Laid-Open No. 290135/2005
Patent document 5: Japanese Patent Application Laid-Open No. 501452/1997
Patent document 6: Japanese Patent Application Laid-Open No. 502239/1999
Patent document 7: Japanese Patent Application Laid-Open No. 283340/1996
Patent document 8: Japanese Patent Application Laid-Open No. 217717/2004
Patent document 9: Japanese Patent Application Laid-Open No. 300192/2004 a production process for the same are not known.
Patent document 10: International Patent Publication No. 03/087172

DISCLOSURE OF THE INVENTION

The present invention has been made in light of the circumstances described above, and an object thereof is to provide a polyolefin base graft copolymer or a thermoplastic resin composition containing the above copolymer which is useful as a modifying agent for polyolefin, a dispersion improving agent and a compatibility-providing agent for different kinds of materials and a process for producing efficiently the same.

Intensive researches repeated by the present inventors have resulted in finding that the object described above can be achieved by a graft copolymer prepared by graft-polymerizing a specific reactive polyolefin (reactive polyolefin I) or a reactive polyolefin (reactive polyolefin II) having an unsaturated group at a chain terminal and/or a principal chain pendant or a combination of the above reactive polyolefins and a polyolefin other than the reactive polyolefins with a specific monomer under the presence of a radical initiator or a thermoplastic resin composition containing the above graft copolymer. The present invention has been completed based on the above knowledge.

That is, the present invention provides:
1. a production process for a graft copolymer or a thermoplastic resin composition containing the above graft copolymer, characterized by graft-polymerizing 100 parts by mass of a combination of 20 to 100% by mass of a reactive polyolefin satisfying the following conditions (1) to (5) and 0 to 80% by mass of a polyolefin other than the reactive polyolefin with 0.2 to 300 parts by mass of at least one monomer selected from the following compounds [I] to [IV] at 40 to 140° C. under the presence of 0.001 to 10 parts by mass of a radical initiator:
(1) the above reactive polyolefin is a homopolymer of one monomer selected from α-olefins having 3 to 28 carbon atoms or a copolymer of two or more kinds thereof or a copolymer of 90% by mass or more of at least one monomer selected from α-olefins having 3 to 28 carbon atoms with 10% by mass or less of ethylene,
(2) a mesopentad ratio [mmmm] is 30 to 80 mole %,
(3) it has 0.5 to 1.0 terminal unsaturated group per molecule,
(4) a molecular weight distribution (Mw/Mn) is 4 or less and
(5) a limiting viscosity [η] which is measured in decalin at 135° C. is 0.01 to 2.5 dl/g;
[I] acrylic acid and derivatives thereof, [II] methacrylic acid and derivatives thereof, [III] vinyl esters and derivatives thereof and [IV] styrene and derivatives thereof,
2. the production process for a graft copolymer or a thermoplastic resin composition containing the above graft copolymer according to the item 1, wherein the graft polymerization is carried out under the presence of Lewis acid,
3. the production process for a graft copolymer or a thermoplastic resin composition containing the above graft copolymer according to the item 1, wherein the graft polymerization is carried out by using the reactive polyolefin in which a vinylidene group accounts for 50 to 100 mole % based on the terminal unsaturated group,
4. the production process for a graft copolymer or a thermoplastic resin composition containing the above graft copolymer according to the item 1, wherein the reactive polyolefin is a propylene homopolymer or a propylene base copolymer of 90% by mass or more of propylene with 10% by mass or less of at least one selected from ethylene and α-olefins having 4 to 28 carbon atoms and satisfies the following conditions (6) and (7):
(6) a racemimesoracemimeso ratio [rmrm] is >2.5 mole % and
(7) a melting point (Tm, unit: ° C.) measured by means of a differential scanning colorimeter (DSC) and [mmmm] satisfy the following relation:

1.76[mmm]−25.0≦Tm≦1.76[mmmm]+5.0

5. the production process for a graft copolymer or a thermoplastic resin composition containing the above graft copolymer according to the item 1, wherein the graft polymerization is carried out by using the reactive polyolefin having 0.8 to 1.0 terminal unsaturated group per molecule,
6. a graft copolymer or a thermoplastic resin composition containing the above graft copolymer obtained by the production process according to the item 1,
7. a graft copolymer which has a principal chain derived from at least one selected from [I] acrylic acid and derivatives thereof, [II] methacrylic acid and derivatives thereof, [III] vinyl esters and derivatives thereof and [IV] styrene and derivatives thereof and which has a side chain derived from a reactive polyolefin satisfying the following conditions (2), (3) and (8), the reactive polyolefin being is a homopolymer of one monomer selected from α-olefins having 3 to 28 carbon atoms, a copolymer of two or more kinds thereof, or a copolymer of 90% by mass or more of at least one monomer selected from α-olefins having 3 to 28 carbon atoms and 10% by mass or less of ethylene, the graft copolymer satisfying the following conditions (a) to (c):
(2) a mesopentad ratio [mmmm] is 30 to 80 mole %,
(3) it has 0.5 to 1.0 terminal unsaturated group per molecule,
(8) it does not contain a both terminal unsaturated group,
(a) a graft rate is 1 to 150% by mass,
(b) a limiting viscosity [η] which is measured in decalin at 135° C. is 0.01 to 2.5 dl/g and
(c) a molecular weight distribution (Mw/Mn) is 1.8 to 6,
8. the graft copolymer according to the item 7, wherein the side chain is a propylene homopolymer or a propylene base copolymer of 90% by mass or more of propylene with 10% by mass or less of at least one selected from ethylene and α-olefins having 4 to 28 carbon atoms, and a racemimesoracemimeso ratio [rmrm] thereof is 2.5 mole % or more,
9. a graft copolymer which has a principal chain derived from at least one selected from [I] acrylic acid and derivatives thereof, [II] methacrylic acid and derivatives thereof, [III] vinyl esters and derivatives thereof and [IV] styrene and derivatives thereof and which has a side chain derived from a reactive polyolefin satisfying the following conditions (2), (3) and (8), the reactive polyolefin being a homopolymer of one monomer selected from α-olefins having 3 to 28 carbon atoms, a copolymer of two or more kinds thereof, or a copolymer of 90% by mass or more of at least one monomer selected from α-olefins having 3 to 28 carbon atoms and 10% by mass or less of ethylene, the graft copolymer satisfying the following conditions (a) to (c):
(2) a mesopentad ratio [mmmm] is 30 to 80 mole %,
(3) it has 0.5 to 1.0 terminal unsaturated group per molecule,
(8) it does not contain a both terminal unsaturated group,
(a) a graft rate is 1 to 150% by mass,
(b) a limiting viscosity [η] which is measured in decalin at 135° C. is 0.01 to 2.5 dl/g and
(c) a molecular weight distribution (Mw/Mn) is 1.5 to 4,
10. a production process for a graft copolymer or a thermoplastic resin composition containing the above graft copolymer, characterized by graft-polymerizing 100 parts by mass of a combination of 20 to 100% by mass of a reactive polyolefin having an unsaturated group at a chain terminal and/or a principal chain pendant and 0 to 80% by mass of a polyolefin other than the reactive polyolefin with total 0.2 to 300 parts by mass of at least one monomer selected from the following group A and at least one monomer selected from the following group B under the presence of 0.001 to 10 parts by mass of a radical initiator:
group A: [V] maleic anhydride and substitution products thereof, [VI] maleic acid and esters thereof and [VII] maleimide and substitution products thereof and
group B: [I] acrylic acid and derivatives thereof, [II] methacrylic acid and derivatives thereof, [III] vinyl esters and derivatives thereof, [IV] styrene and derivatives thereof and [VIII] α-olefins,
11. the production process for a graft copolymer or a thermoplastic resin composition containing the above graft copolymer according to the item 10, wherein the graft polymerization is carried out under the presence of Lewis acid,
12. the production process for a graft copolymer or a thermoplastic resin composition containing the above graft copolymer according to the item 10, wherein the graft polymerization is carried out at 20 to 140° C. by using the reactive polyolefin in which a vinylidene group accounts for 50 to 100 mole % based on the terminal unsaturated group,
13. the production process for a graft copolymer or a thermoplastic resin composition containing the above graft copolymer according to the item 10, wherein the reactive polyolefin is a propylene base polymer of 90 to 100% by mass of propylene with 0 to 10% by mass of at least one selected from ethylene, α-olefins having 4 to 28 carbon atoms, polyenes and cyclic olefins or an ethylene base polymer of 70 to 100% by mass of ethylene with 0 to 30% by mass of at least one selected from α-olefins having 3 to 28 carbon atoms, polyenes and cyclic olefins,
14. the production process for a graft copolymer or a thermoplastic resin composition containing the above graft copolymer according to the item 10, wherein it is the propylene base polymer in which a mesopentad ratio [mmmm] of the reactive polyolefin falls in a range of 20 to 99 mole %,
15. the production process for a graft copolymer or a thermoplastic resin composition containing the above graft copolymer according to the item 13, wherein the polyene is a compound having at least one kind of two or more carbon-carbon unsaturated bonds,
16. the production process for a graft copolymer or a thermoplastic resin composition containing the above graft copolymer according to the item 10, wherein the monomer of the group A is [V] maleic anhydride and the substitution products thereof,
17. a graft copolymer or a thermoplastic resin composition containing the above graft copolymer obtained by the production process according to the item 10,
18. a graft copolymer having a structure in which an unsaturated group of a chain terminal and/or a principal chain pendant in a reactive polyolefin comprising at least one selected from α-olefins having 2 to 28 carbon atoms is introduced into a copolymerized chain derived from at least one monomer selected from the following group A and at least one monomer selected from the following group B and satisfying the following conditions (a) to (c):
group A: [V] maleic anhydride and substitution products thereof, [VI] maleic anhydride and esters thereof and [VII] maleimide and substitution products thereof and group B: [I] acrylic acid and derivatives thereof, [II] methacrylic acid and derivatives thereof, [III] vinyl esters and derivatives thereof, [IV] styrene and derivatives thereof and [VIII] α-olefins,
(a) a graft rate is 1 to 150% by mass,
(b) a limiting viscosity [η] which is measured in decalin at 135° C. is 0.01 to 2.5 dl/g and
(c) a molecular weight distribution (Mw/Mn) is 1.8 to 6,
19. a graft copolymer having a structure in which an unsaturated group of a chain terminal and/or a principal chain pendant in a reactive polyolefin comprising at least one selected from α-olefins having 2 to 28 carbon atoms is introduced into a copolymerized chain derived from at least one monomer selected from the following group A and at least one monomer selected from the following group B and satisfying the following conditions (a) to (c):
group A: [V] maleic anhydride and substitution products thereof, [VI] maleic anhydride and esters thereof and [VII] maleimide and substitution products thereof and
group B: [I] acrylic acid and derivatives thereof, [II] methacrylic acid and derivatives thereof, [III] vinyl esters and derivatives thereof, [IV] styrene and derivatives thereof and [VIII] α-olefins,
(a) a graft rate is 1 to 150% by mass,
(b) a limiting viscosity [η] which is measured in decalin at 135° C. is 0.01 to 2.5 dl/g and
(c) a molecular weight distribution (Mw/Mn) is 1.5 to 4,
20. the graft copolymer according to the item 18, wherein the reactive polyolefin chain is a propylene base polymer of 90 to 100% by mass of propylene with 0 to 10% by mass of at least one selected from ethylene, α-olefins having 4 to 28 carbon atoms, polyenes and cyclic olefins or an ethylene base polymer of 70 to 100% by mass of ethylene with 0 to 30% by mass of at least one selected from α-olefins having 3 to 28 carbon atoms, polyenes and cyclic olefins,
21. the graft copolymer according to the item 18, wherein it is the propylene base polymer in which a mesopentad ratio [mmmm] of the reactive polyolefin falls in a range of 20 to 99 mole %,
22. the graft copolymer according to the item 18, wherein the monomer of the group A is [V] maleic anhydride and the substitution products thereof,
23. the graft copolymer according to the item 7 or 18, wherein a sea-island structure is present in a molded matter produced by heating, melting, cooling and solidifying, and the molded matter contains an island part having a particle diameter of 10 to 100 nm,
24. a thermoplastic resin composition comprising the graft copolymer according to the item 7 or 18 and polyolefin,
25. a composition prepared by adding a thermoplastic resin to the graft copolymer according to the item 7 or 18 or a thermoplastic resin composition comprising the graft copolymer according to the item 7 or 18 and polyolefin,
26. a composition comprising the graft copolymer according to the item 7 or 18 or a thermoplastic resin composition containing the graft copolymer according to the item 7 or 18 and polyolefin and an inorganic filler and/or a pigment and
27. a composition comprising the graft copolymer according to the item 7 or 18 or a thermoplastic resin composition containing the graft copolymer according to the item 7 or 18 and polyolefin, a thermoplastic resin and an inorganic filler and/or a pigment.

According to the present invention, a graft copolymer which does not have an irregular structure such as a cross-linked structure and comprises a side chain polyolefin linkage and a principal chain derived from a specific monomer and which has a high structural controllability or a thermoplastic resin composition containing the above graft copolymer can efficiently be produced by using a specific reactive polyolefin (reactive polyolefin I) or a reactive polyolefin (reactive polyolefin II) having an unsaturated group at a chain terminal and/or a principal chain pendant.

Accordingly, the above copolymer or the thermoplastic resin composition containing the above copolymer does not have an irregular structure such as a cross-linked structure and comprises a wide range of monomers (for example, polar monomer species), and a content of the above monomer is high, so that the adhesive property and the compatibility are exhibited by using a small amount thereof. A side chain polyolefin linkage and a specific monomer chain (for example, polar monomer chain) are present in one molecule, and therefore it is excellent in a dispersion effect between different kinds of materials and a compatibility-providing effect.

BRIEF EXPLANATION OF THE DRAWINGS

FIG. 1 is a transmission type electron microscopic photograph (18000 magnification) of the graft copolymer prepared in Example 5.

BEST MODE FOR CARRYING OUT THE INVENTION

The reactive polyolefin I used in the present invention is a homopolymer of one monomer selected from α-olefins having 2 to 28 carbon atoms or a copolymer of two or more kinds thereof.

The α-olefin having 2 to 28 carbon atoms include ethylene, propylene, 1-btene, 1-pentene, 4-methylpentene-1,1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene, 1-icocene and the like.

To be more specific, the reactive polyolefin I described above is a homopolymer of one monomer selected from α-olefins having 3 to 28 carbon atoms or a copolymer of two or more kinds thereof or a copolymer of 90% by mass or more of at least one monomer selected from α-olefins having 3 to 28 carbon atoms with 10% by mass or less of ethylene.

The α-olefin/ethylene copolymer described above is more preferably a copolymer of 92% by mass or more of α-olefin with 8% by mass or less of ethylene, further preferably a copolymer of 95% by mass or more of the α-olefin with 5% by mass or less of ethylene.

Also, the reactive polyolefin I is preferably a propylene homopolymer, a propylene base copolymer of 90% by mass or more of propylene with 10% by mass or less of at least one selected from ethylene and α-olefins having 4 to 28 carbon atoms, a butene homopolymer, a butene base copolymer of 90% by mass or more of 1-butene with 10% by mass or less of at least one selected from ethylene, propylene and α-olefins having 5 to 28 carbon atoms, a homopolymer comprising one kind of α-olefins having 12 to 28 carbon atoms, a copolymer comprising two or more kinds of α-olefins having 12 to 28 carbon atoms or a copolymer of one kind of α-olefins having 12 to 28 carbon atoms with 10% by mass or less of ethylene and α-olefin having 3 to 10 carbon atoms.

Further, the propylene base copolymer described above is more preferably a propylene base copolymer of 92% by mass or more of propylene with 8% by mass or less of at least one selected from ethylene and α-olefins having 4 to 28 carbon atoms, further preferably a propylene base copolymer of 95% by mass or more of propylene with 5% by mass or less of at least one selected from ethylene and α-olefins having 4 to 28 carbon atoms.

The reactive polyolefin I used in the present invention has to satisfy the following conditions (2) to (5).

In this case, the reactive polyolefin I is a homopolymer of one monomer selected from α-olefins having 3 to 28 carbon atoms or a copolymer of two or more kinds thereof or a copolymer of 90% by mass or more of at least one monomer selected from α-olefins having 3 to 28 carbon atoms with 10% by mass or less of ethylene:

(2) a mesopentad ratio [mmmm] is 30 to 80 mole %,
(3) it has 0.5 to 1.0 terminal unsaturated group per molecule,
(4) a molecular weight distribution (Mw/Mn) is 4 or less and
(5) a limiting viscosity [η] which is measured in decalin at 135° C. is 0.01 to 2.5 dl/g.

The reactive polyolefin I described above has a mesopentad ratio [mmmm] of 30 to 80 mole %.

The mesopentad ratio [mmmm] described above is preferably 30 to 75 mole %, more preferably 32 to 70 mole %

If the mesopentad ratio is 30 mole % or more, the reactive polyolefin I becomes crystalline, and therefore the heat resistance is shown. If it is 80 mole % or less, the reactive polyolefin I is suitably softened and therefore improved in a solubility in a solvent, and it can widely be applied to solution reaction and the like.

When it is a polymer comprising polypropylene as a principal component, a stereoregularity thereof is determined in the following manner.

The mesopentad ratio [mmmm] described above and a racemipentad ratio [rrrr] and a racemimesoracemimeso ratio [rmrm] each described later are a meso ratio, a racemic ratio and a racemimesoracemimeso ratio in a pentad unit in a polypropylene molecular chain which are measured by signals of methyl in $^{13}$C-NMR according to a method proposed in "Macromolecules, 6, 925 (1973)" by A. Zambelli et al.

If the mesopentad ratio [mmm] grows large, the stereoregularity grows high.

A $^{13}$C-NMR spectrum can be measured on the following conditions by means of the following apparatus according to assignment of peaks proposed in "Macromolecules, 8, 687 (1975)" by A. Zambelli et al.

Also, a mesotriad ratio [mm], a racemic triad ratio [rr] and a mesoracemic ratio [mr] are calculated as well by the method described above.

Apparatus: JNM-EX400 type $^{13}$C-NMR apparatus, manufactured by JEOL Ltd.
Method: proton complete decoupling method
Density: 220 mg/ml
Solvent: 90:10 (volume ratio) mixed solvent of 1,2,4-trichlorobenzene and heavy benzene
Temperature: 130° C.
Pulse width: 45°
Pulse repeating time: 4 seconds
Integration: 10000 times
<Calculation formula>

$$M=(m/S)\times 100$$

$$R=(\gamma/S)\times 100$$

$$S=P\beta\beta+P\alpha\beta+P\alpha\gamma$$

S: signal intensity of a side chain methyl carbon atom in the whole propylene units
Pββ: 19.8 to 22.5 ppm
Pαβ: 18.0 to 17.5 ppm
Pαγ: 17.5 to 17.1 ppm
γ: racemic pentad chain: 20.7 to 20.3 ppm
m: mesopentad chain: 21.7 to 22.5 ppm In the case of a polymer comprising polybutene as a principal component, a stereoregularity thereof is determined in the following manner.

The mesopentad ratio [mmmm] and the abnormal insertion content (1,4 insertion ratio) were determined according to methods proposed in "Polymer Journal, 16, 717 (1984)" reported by Asakura et al., "Macromol. Chem. Phys., C29, 201 (1989)" reported by J. Randall and "Macromol. Chem. Phys., 198, 1257 (1997)" reported by V. Busico et al.

That is, a $^{13}$C nuclear magnetic resonance spectrum was used to measure signals of methylene group and methine group, and a mesopentad ratio [mmm] and an abnormal insertion content in a poly(1-butene) molecule were determined.

The $^{13}$C nuclear magnetic resonance spectrum was measured on the conditions described above by means of the apparatus described above.

The stereoregularity index [(mmm)/(mm+rmmr)] was calculated from values obtained by measuring (mmmm), (mmrr) and (rmrr) by the method described above.

The racemic triad ratio (rr) can be calculated as well by the method described above.

A stereoregularity index [(mmmm)/(mmrr+rmmr)] of 1-butene homopolymer and copolymer is 20 or less, preferably 18 or less and more preferably 15 or less.

If the stereoregularity index exceeds 20, a reduction in the flexibility is brought about.

In the case of a polymer comprising α-olefin having 5 or more carbon atoms as a principal component, a stereoregularity thereof is determined in the following manner.

A stereoregularity index $M_2$ thereof was determined according to a methods proposed in "Macromolecules, 24, 2334 (1991)" reported by T. Asakura, M. Demura and Y. Nishiyama.

That is, $M_2$ can be determined by making use of the fact that $CH_2$ carbon at an α position of a side chain which originates in higher α-olefin is observed to be split reflecting a difference in a stereoregularity in a $^{13}$C NMR spectrum.

In the present invention, $M_2$ can be replaced by the mesopentad ratio [mmm] described above.

It is shown that the larger the above value is, the higher the isotacticity is.

A measuring apparatus and conditions for a $^{13}$C nuclear magnetic resonance spectrum are the same as described above, and a stereoregularity index $M_2$ thereof is determined in the following manner.

Six large absorption peaks based on a mixed solvent are observed at 127 to 135 ppm. Among these peaks, a value of the fourth peak from a lower magnetic field side is observed at 131.1 ppm and set to a standard for chemical shift.

In this case, an absorption peak based on $CH_2$ carbon at an α position of a side chain is observed in the vicinity of 34 to 37 ppm.

In the above case, $M_2$ (mole %) is determined by using the following formula.

$$M_2=[(\text{integrated intensity at 36.2 to 35.3 ppm})/(\text{integrated intensity at 36.2 to 34.5 ppm})]\times 100$$

The reactive polyolefin I described above has 0.5 to 1.0, preferably 0.6 to 1.0, more preferably 0.7 to 1.0, more preferably 0.8 to 1.0, more preferably 0.82 to 1.0, further preferably 0.85 to 1.0 and most preferably 0.90 to 1.0 terminal unsaturated group per molecule.

If it has 0.5 or more terminal unsaturated group, a density of the unsaturated group is high, and a production efficiency of the graft copolymer is elevated.

The terminal unsaturated group is preferably a vinylidene group, and a vinylidene group accounts for usually 50 to 100 mole %, preferably 60 to 100 mole %, more preferably 70 to 100 mole % and further preferably 80 to 100 mole % based on the terminal unsaturated group.

The reactive polyolefin I used in the present invention does not contain a component having 2 or more unsaturated groups per molecule, for example, a component having unsaturated groups at both terminals.

The component having 2 or more unsaturated groups per molecule acts as a so-called cross-linking agent and therefore forms a cross-linked structure (H type) in graft polymerization to by-produce a gel component, so that it is not preferred.

Accordingly, unsaturated polypropylene produced by thermal cracking can not be used.

The reactive polyolefin II described later includes a case in which it has 2 or more unsaturated groups per molecule.

The terminal unsaturated group described above is measured usually by using an infrared absorption spectrum method, a nuclear magnetic resonance spectrum method, a bromination method and the like, and it can be measured by any method.

The infrared absorption spectrum method can be carried out according to a method described in "New Edition Polymer Analytical Handbook, edited by Japan Society for Analytical Chemistry, Polymer Analysis Research Talkfest".

According to the above method, in a determination method for a terminal unsaturated group by an infrared absorption spectrum method, an unsaturated group such as a vinyl group, a vinylidene group, a trans(vinylene) group and the like can quantitatively be determined respectively from absorptions of 910 $cm^{-1}$, 888 $cm^{-1}$ and 963 $cm^{-1}$ in an infrared absorption spectrum.

Also, a vinylidene unsaturated group is quantitatively determined by a nuclear magnetic resonance spectrum method in the following manner.

When a terminal unsaturated group is a vinylidene group, the number thereof is determined by measuring $^1$H-NMR according to a conventional method.

A content (C) (mole %) of the vinylidene group is calculated according to a conventional method based on the vinylidene group appearing in δ4.8 to 4.6 (2H) obtained from $^1$H-NMR measurement.

Further, the number of the vinylidene group per molecule is calculated from an average molecular weight (Mn) and a monomer molecular weight (M) determined from gel permeation chromatography (GPC) according to the following formula:

$$\text{terminal vinylidene group per molecule} = (Mn/M) \times (C/100)$$

An example of a method according to a nuclear magnetic resonance spectrum method includes a method based on quantitative determination of a terminal group. To be specific, it is a method in which terminal groups produced by polymerization reaction and existential amounts thereof are measured by $^1$H-NMR and $^{13}$C-NMR to calculate the number of the terminal vinylidene groups per molecule from an existential proportion of the terminal vinylidene groups based on an amount of the whole terminal groups. A case of a propylene polymer shall be shown as an example thereof.

Analysis of Unsaturated Terminal Amount by $^1$H-NMR:

[2] Methylene (4.8 to 4.6 ppm) of a vinylidene group and [1] methylene (5.10 to 4.90 ppm) of a vinyl group are observed in the propylene polymer. The proportion based on the whole propylene polymer can be calculated according to the following formula. Further, [3] corresponds to peak intensities corresponding to methine, methylene and methyl in a propylene chain (0.6 to 2.3 ppm).

$$\text{Terminal vinylidene group amount}(A) = ([2]/2)/[([3]+4\times[1]/2+3\times[2]/2)/6]\times 100 \text{ unit:mol \%}$$

$$\text{Terminal vinyl group amount}(B) = ([1]/2)/[([3]+4\times[1]/2+3\times[2]/2)/6]\times 100 \text{ unit:mol \%}$$

Analysis of Terminal Ratio by $^{13}$C-NMR:

In the propylene polymer of the present application, observed are [5] terminal methyl (vicinity of 14.5 ppm) of a n-propyl terminal, [6] terminal methyl (vicinity of 14.0 ppm) of a n-butyl terminal and [7] methylene (vicinity of 111.7 ppm) of a vinylidene terminal. A peak intensity of a terminal vinyl group amount in $^{13}$C-NMR is calculated in the following manner by using (A) and (B) which have been determined in the $^1$H-NMR spectrum:

$$\text{peak intensity of a terminal vinyl group amount in } ^{13}\text{C-NMR} = (B)/(A)\times[7]$$

in this respect, the whole density (T) of the terminal group is expressed in the following manner:

$$T = (B)/(A)\times[7]+[4]+[5]+[6]+[7]$$

accordingly, the proportions of the respective terminals are:
(C) terminal vinylidene group = [7]/T×100 unit:mol %
(D) terminal vinyl group = (B)/(A)×[7]×100
(E) n-propyl terminal = [5]/T×100
(F) n-butyl terminal = [6]/T×100
(G) isobutyl terminal = [4]/T×100

The number of the terminal vinylidene group per molecule is 2×(C)/100 unit: group/molecule The reactive polyolefin I described above has a molecular weight distribution (Mw/Mn) of 4 or less, preferably 3.5 or less, more preferably 3 or less and further preferably 2.5 or less.

The narrower molecular weight distribution is more preferred, and this is because of the reason that in the graft copolymer of the present invention or a thermoplastic resin composition containing the above graft copolymer, the reactive polyolefin I forms a chain and therefore is less dispersed in a side chain length (chain length) and that the graft copolymer in which a structure is controlled is produced.

The molecular weight distribution (Mw/Mn) can be determined by measuring the weight average molecular weight (Mw) and the number average molecular weight (Mn) on the following conditions by means of the following apparatus according to gel permeation chromatography (GPC).

GPC Measuring Apparatus:
  Detector: RI detector for liquid chromatography Waters 150 C
  Column: TOSO GMHHR—H(S) HT
Measuring Conditions:
  Solvent: 1,2,4-trichlorobenzene
  Measuring temperature: 145° C.
  Flow rate: 1.0 ml/minute
  Sample concentration: 0.3% by mass The weight average molecular weight (Mw) and the number average molecular weight (Mn) were determined by a universal calibration method using constants K and α in a formula of Mark-Houwink-Sakurada in order to reduce the polystyrene-reduced molecular weight to a molecular weight of the corresponding polymer.

To be specific, they were determined by a method described in "Size Exclusion Chromatography, written by S. Mori, p. 67 to 69, 1992, Kyoritsu Shuppan".

K and α are described in "Polymer Handbook, John Wiley & Sons, Inc.".

They can be determined from a relation of the limiting viscosity to the absolute molecular weight newly calculated by a conventional method.

The reactive polyolefin I described above has a limiting viscosity [η] of 0.01 to 2.5 dl/g, preferably 0.05 to 2.5 dl/g, more preferably 0.05 to 2.0 dl/g, further preferably 0.1 to 2.0 dl/g and most preferably 0.15 to 1.8 dl/g which is measured in decalin at 135° C.

If the limiting viscosity [η] falls in the range described above, the graft polyolefin has a satisfactory polyolefin side chain length (chain length), exerts sufficiently functions such as a compatibility and the like and is increased in a density of a terminal unsaturated group in graft polymerization, and therefore the radical polymerizability is raised.

The limiting viscosity [η] is calculated by measuring a reduced viscosity ($\eta_{SP}/c$) in decalin of 135° C. by means of a Ubbelohde viscometer and using the following formula (Haggins formula):

$$\eta_{SP}/c=[\eta]+K[\eta]^2c$$

$\eta_{SP}/c$ (dl/g): reduced viscosity
[η] (dl/g): limiting viscosity
c(g/dl): polymer concentration
K=0.35 (Haggins constant)

The reactive polyolefin I described above satisfies preferably the following conditions (6) to (7).

In the above case, the reactive polyolefin I is preferably a propylene homopolymer or a copolymer of 90% by mass or more of propylene with 10% by mass or less of at least one selected from ethylene and α-olefins having 4 to 28 carbon atoms:

(6) a racemimesoracemimeso ratio [rmrm] is >2.5 mole % and (7) a melting point (Tm, unit: ° C.) measured by means of a differential scanning calorimeter (DSC) and [mmmm] satisfy the following relation:

$$1.76[mmmm]-25.0 \leq Tm \leq 1.76[mmmm]+5.0$$

If a racemimesoracemimeso ratio [rmrm] of the reactive polyolefin I described above exceeds 2.5 mole %, a random property is increased, and a transparency is further enhanced.

The relational formula described above between the melting point (Tm, unit: ° C.) measured by means of a differential scanning calorimeter (DSC) and [mmmm] shows an evenness in a mesopentad ratio of the reactive polyolefin I.

When an evenness in a stereoregularity of the reactive polyolefin I is high, that is, when the stereoregularity distribution is narrow, it shows that an evenness of a side chain of the graft copolymer is high, and a compatibility thereof with a polypropylene base resin and the like is elevated. When the reactive polyolefin I having a high mesopentad ratio and the reactive polyolefin I having a low mesopentad ratio are present in a mixture or block-bonded, that is, when the stereoregularity distribution is broad, a compatibility thereof with a polypropylene base resin and the like is reduced, and therefore it is not preferred. The [mmmm] described above is measured as an average value, and a case where the stereoregularity distribution is broad and a case where the stereoregularity distribution is narrow can not clearly be distinguished. As described above, however, the preferred reactive propylene base copolymer having a high evenness can be prescribed by limiting a relation with the melting point (Tm) to a specific range.

When the melting point (Tm) exceeds (1.76[mmmm]+5.0), it shows that the site having a partially high stereoregularity and the site having no stereoregularity are present.

Also, when the melting point (Tm) does not reach (1.76 [mmmm]−25.0), it is likely that the heat resistance is not sufficiently high.

From the viewpoint described above, preferred is:

$$1.76[mmmm]-20.0 \leq Tm \leq 1.76[mmmm]+3.0$$

more preferred is:

$$1.76[mmmm]-15.0 \leq Tm \leq 1.76[mmmm]+2.0$$

The melting point (Tm) described above is determined by DSC measurement.

The sample 10 mg was heated from 25° C. to 220° C. at 320° C./minute under nitrogen atmosphere and held at 220° C. for 5 minutes, and then it was cooled down to 25° C. at 320° C./minute and held at 25° C. for 50 minutes. A peak top of an endothermic peak observed at a highest temperature side of a melting heat absorption curve detected in the above heating step was set to the melting point (Tm).

The reactive polyolefin I described above satisfies preferably the following conditions (11) to (13).

$$[rrrr]/(1-[mmmm]) \leq 0.1 \quad (11)$$

If the relation described above is satisfied, the stickiness is inhibited:

$$[mm] \times [rr]/[mr]^2 \leq 2.0 \quad (12)$$

If a value of $[mm]\times[rr]/[mr]^2$ is 2.0 or less, the transparency is inhibited from being reduced, and a balance between the flexibility and the elasticity recovering rate is improved.

The term $[mm]\times[rr]/[mr]^2$ falls in a range of preferably 1.8 to 0.5, more preferably 1.5 to 0.5.

(13) A component amount (W25) eluted at 25° C. or lower in a temperature programming chromatography is 20 to 100% by mass.

A component amount (W25) of the reactive polyolefin I eluted at 25° C. or lower in the temperature programming chromatography described above is preferably 30 to 100% by mass, more preferably 50 to 100% by mass.

W25 is an index showing whether or not the reactive polyolefin I is soft. If this value is reduced, the component having a high elastic modulus is increased, and an unevenness of the mesopentad ratio [mmm] is extended.

If W25 is 20% by mass or more in the reactive polyolefin I described above, the flexibility is maintained.

W25 is an amount (% by mass) of a component eluted without being adsorbed on a filler at a column temperature of 25° C. of TREF (temperature programming elution fractionation) in an elution curve obtained by measuring by a temperature programming chromatography of the following operation method, apparatus constitution and measuring conditions.

(1) Operating Method:
A sample solution is introduced into a TREF column controlled to a temperature of 135° C. and then slowly cooled down to 0° C. at cooling rate of 5° C./hour, and it is held for 30 minutes to crystallize the sample on a surface of the filler. Then, the column was heated up to 135° C. at heating rate of 40° C./hour to obtain an elution curve.

(2) Apparatus Constitution:
TREF column: silica gel column (4.60φ×150 mm), manufactured by GL Science Co., Ltd.
Flow cell: KBr cell having an optical path length of 1 mm, manufactured by GL Science Co., Ltd.
Solution sending pump: SSC-3100 pump, manufactured by Senshu Scientific Co., Ltd.
Valve oven: MODEL 554 oven (high temperature type), manufactured by GL Science Co., Ltd.

TREF oven: manufactured by GL Science Co., Ltd.
Double line temperature controlling device: REX-C100 temperature controlling device, manufactured by Rigaku Industry Co., Ltd.
Detector: infrared detector for liquid chromatography, MIRAN 1A CVF, manufactured by FOXBORO Inc.
Ten way valve: electric valve, manufactured by Barco Co., Ltd.
Loop: 500 μl loop, manufactured by Barco Co., Ltd.
(3) Measuring Conditions:
Solvent: o-dichlorobenzene
Sample concentration: 7.5 g/L
Injection amount: 500 μl
Pump flow amount: 2.0 ml/minute
Detection wave number: 3.41 μm
Column filler: chromosolve P (30 to 60 mesh)
Column temperature distribution: ±0.2° C. or lower The reactive polyolefin (reactive polyolefin II) having an unsaturated group on a chain terminal and/or a principal chain pendant according to the present invention is preferably a propylene base polymer of 90 to 100% by mass of propylene with 0 to 10% by mass of at least one selected from ethylene, α-olefins having 4 to 28 carbon atoms, polyenes and cyclic olefins, an ethylene base polymer of 70 to 100% by mass of ethylene with 0 to 30% by mass of at least one selected from α-olefins having 3 to 28 carbon atoms, polyenes and cyclic olefins, a butene base polymer of 90 to 100% by mass of 1-butene with 0 to 10% by mass of at least one selected from ethylene, propylene, α-olefins having 5 to 28 carbon atoms, polyenes and cyclic olefins and an α-olefin base polymer of 90 to 100% by mass of at least one of α-olefins having 12 to 28 carbon atoms with 0 to 10% by mass of at least one selected from ethylene, α-olefins having 3 to 10 carbon atoms, polyenes and cyclic olefins.

As can be found from the descriptions described above, the compound represented as the reactive polyolefin I satisfies the prescriptions of the reactive polyolefin II. Accordingly, the compound corresponding to the reactive polyolefin I can be used as the reactive polyolefin II, and the reactive polyolefin used can suitably be determined so that it meets the structure of the targeted graft copolymer.

According to the prescriptions of the reactive polyolefin II, a monomer such as maleic anhydride and the like (that is, a monomer which is less liable to be polymerized with the same kind of monomers because of a small electron density) can efficiently be introduced into the graft copolymer. Conversely, an effect of enhancing a reactivity of the reactive polyolefin is obtained by using a monomer such as maleic anhydride and the like, and the graft copolymer can efficiently be produced. This is preferred in terms of reducing a gel. The above effect is not obtained by a conventional production process for modified polyolefin in which polyolefin as a principal chain is subjected to modifying treatment with maleic anhydride.

In the propylene base polymer and the ethylene base polymer each described above, a content of the polyene is 0 to 10% by mass, preferably 0.01 to 9% by mass and more preferably 0.05 to 8% by mass based on the polymer. If a content of the polyene is 10% by mass or less, a gel component is not produced, and therefore it is preferred.

In the reactive polyolefin II of the present invention, the polyenes and the cyclic olefins include the compound group of the following polyenes and cyclic olefins.

The other olefins include the same ones as described for the reactive polyolefin I described above.

(1) Polyenes having at least 2 or more carbon-carbon unsaturated bonds:
To be specific, α, ω-diolefins such as 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,13-tetradecadiene, 1,15-hexadecadiene, 4-methyl-1,9-decadiene, 4,4-dimethyl-1,9-decadiene, 5-allyl-1,9-decadiene, 1,9-eicodiene and the like; polyenes having a styrene skeleton in a molecule, such as p-divinylbenzene, m-divinylbenzene, o-divinylbenzene, di(p-vinylpheyl)methane, 1,3-bis(p-vinylpheyl)propane, 1,5-bis(p-vinylpheyl)pentane and the like; polyenes having a cyclic olefin skeleton in a molecule, such as dicyclopentadiene, dimethyldicyclopentadiene, diethyldicyclopentadiene, bicycle[2.2.1]hepto-2,5-diene, tetracyclo[4.4.0.12,5.17,10]-3,8-dodecadiene, hexacyclo[6.6.13,6.110,13.02,709,14]-4,11-heptadecadiene and the like; polyenes having a styrene skeleton/α-olefin skeleton in a molecule, such as p-(2-propenyl)styrene, m-(2-propenyl)styrene, p-(3-butenyl)styrene, m-(3-butenyl)styrene, o-(3-butenyl)styrene, p-(4-pentenyl)styrene, m-(4-pentenyl)styrene, o-(4-pentenyl)styrene, p-(7-octenyl)styrene, p-(1-methyl-3-butenyl)styrene, p-(2-methyl-3-butenyl)styrene, m-(2-methyl-3-butenyl)styrene, o-(2-methyl-3-butenyl)styrene, p-(3-methyl-3-butenyl)styrene, p-(2-ethyl-3-butenyl)styrene, p-(2-ethyl-4-pentenyl)styrene, p-(3-butenyl)-α-methylstyrene, m-(3-butenyl)-α-methylstyrene, o-(3-butenyl)-α-methylstyrene and the like; polyenes having a cyclic olefin skeleton/olefin skeleton in a molecule, such as 5-vinyl-2-norbornene, 5-(3-butenyl)-2-norbornene, 5-(allyl)-2-norbornene, 5-(4-pentenyl)-2-norbornene, 5-(5-hexenyl)-2-norbornene, 5-(7-octenyl)-2-norbornene, 5-ethylidene-2-norbornene, 5-vinylbicyclo[2.2.1]hepto-2-ene, 5-allylbicyclo[2.2.1]hepto-2-ene, 5-(3-butenyl)bicyclo[2.2.1]hepto-2-ene, 8-vinyltetracyclo[4.4.0.12,5.17,10]-3-dodecene, 11-vinylhexacyclo[6.6.1.13,6.110,13.02,7.09,14]-4-heptadecene and the like; polyenes having α-olefin skeleton/carbon-carbon unsaturated group, such as 4-ethylidene-8,12-dimethyl-1,7,11-tridecatriene, 6,7-dimethyl-4-ethylidene-1,6-octadiene, 6,7-dimethyl-4-ethylidene-1,6-nonadiene, 7-methyl-6-propyl-4-ethylidene-1,6-octadiene, 8-methyl-4-ethylidene-1,7-nonadiene, 7,8-dimethyl-4-ethylidene-1,7-nonaadiene, 9-methyl-4-ethylidene-1,8-decadiene, 8,9-dimethyl-4-ethylidene-1,8-decadiene, 6,10-dimethyl-1,5,9-undecatriene, 5,9-dimethyl-1,4,8-decatriene and the like and butadiene polymers and isoprene polymers such as 3,7-dimethyl-1,6-octadiene and the like.

The polyenes described above excluding the butadiene polymers and the isoprene polymers can be synthesized, for example, by free radical reaction in which a Grignard reagent (allyl-MgX or vinyl-MgX) prepared from a vinyl group-containing halide (for example, allyl halide) and metal Mg is used and in which the above Grignard reagent is reacted with halide of non-conjugate double bond-containing linear hydrocarbon (for example, geranyl halide).

(2) Cyclic Olefins:
To be specific, bicyclo[2.2.1]hepto-2-ene derivatives such as bicyclo[2.2.1]hepto-2-ene (norbornene), 5-methylbicyclo[2.2.1]hepto-2-ene, 5,6-dimethylbicyclo[2.2.1]hepto-2-ene, 1-methylbicyclo[2.2.1]hepto-2-ene, 5-ethylbicyclo[2.2.1]hepto-2-ene, 5-n-butylbicyclo[2.2.1]hepto-2-ene, 5-isobutylbicyclo[2.2.1]hepto-2-ene, 7-methylbicyclo[2.2.1]hepto-2-ene and the like; tricyclo[4.3.0.12,5]-3-decene derivatives such as tricyclo[4.3.0.12,5]-3-decene, 2-methyltricyclo[4.3.0.12,5]-3-decene, 5-methyltricyclo[4.3.0.12,5]-3-decene and the like; and tricyclo[4.4.0.12,5]-3-undecene derivatives such as tricyclo[4.4.0.12,5]-3-undecene, 10-methyltricyclo[4.10.0.12,5]-3-undecene and the like.

Further, the reactive polyolefin II of the present invention includes as well olefin base copolymers containing polyenes such as ethylene-propylene-diene ternary copolymers (EPDM) and the like.

An unsaturated group of the reactive polyolefin II described above is usually a vinylidene group, and the vinylidene group accounts usually for 30 to 100 mole % based on the unsaturated group.

The vinylidene group accounts for preferably 40 to 100 mole %, more preferably 50 to 100 mole % based on the unsaturated group.

A mesopentad ratio [mmm] of the reactive polyolefin II falls in a range of usually 20 to 99 mole %.

In this case, the reactive polyolefin II described above is preferably a propylene base polymer of 90 to 100% by mass of propylene with 0 to 10% by mass of at least one selected from ethylene, α-olefins having 4 to 28 carbon atoms, polyenes and cyclic olefins.

The mesopentad ratio [mmm] is preferably 30 to 98 mole % more preferably 40 to 97 mole %.

The reactive polyolefin I and the reactive polyolefin II (hereinafter, they shall be abbreviated collectively as "the reactive polyolefins I, II") according to the present invention are produced preferably by a metallocene catalyst.

The metallocene catalyst is catalysts which comprise (A) transition metal compounds having a cyclopentadienyl group, a substituted cyclopentadienyl group, an indenyl group, a substituted indenyl group and the like and comprising metal elements of the 3rd to 10th groups in the periodic table and (B) compounds capable of being reacted with the transition metal compounds to form ionic complexes and which can form terminal unsaturated groups.

The transition metal compounds include compounds comprising a biscyclopentadienyl ligand, such as zirconocene chloride, pentamethylcyclopentadienylzirconium dichloride and the like, compounds comprising a cross-linked indenyl ligand, such as ethylenebisindenylzirconium dichloride, dimethylsilylene-bis-[2-methyl-4-phenylindenyl]zirconium dichloride, dimethylsilylene-bis-[2-methyl-4,5-benzoindenyl]zirconium dichloride and the like, compounds comprising a mopnocyclopentadienyl ligand, such as pentamethylcyclopentadienyltrimethoxytitanium, pentamethylcyclopentadienyltrichlorotitanium and the like and compounds comprising an azulenium ligand, such as dichloro[dimethylsilylene(cyclopentadienyl)(2,4-dimethyl-4H-1-azulenyl)]hafnium, dichloro[dimethylgermylene-(cyclopentadienyl)(2,4-dimethyl-4H-1-azulenyl)]hafnium, dichloro[dimethylsilylene(2-methyl-1-indenyl)(2,4-dimethyl-4H-1-azulenyl)]hafnium and the like.

Further, they include double cross-linked transition metal compounds represented by the following Formula (I).

In particular, the reactive polyolefin I according to the present invention is preferably a polymer produced by a catalyst comprising a dicross-linked complex represented by the following Formula (I), the polymer being a homopolymer of one monomer selected from α-olefins having 3 to 28 carbon atoms, a copolymer of two or more kinds thereof, a copolymer of 90% by mass or more of at least one monomer selected from α-olefins having 3 to 28 carbon atoms with 10% by mass or less of ethylene, a propylene homopolymer or a propylene base copolymer of 90% by mass or more of propylene with 10% by mass or less of at least one selected from ethylene and α-olefins having 4 to 28 carbon atoms.

The reactive polyolefin II according to the present invention is preferably a polymer produced by a catalyst comprising the dicross-linked complex represented by the following Formula (I), the polymer being a propylene base polymer of 90 to 100% by mass of propylene with 0 to 10% by mass of at least one selected from ethylene, α-olefins having 4 to 28 carbon atoms, polyenes and cyclic olefins or an ethylene base polymer of 70 to 100% by mass of ethylene with 0 to 30% by mass of at least one selected from α-olefins having 3 to 28 carbon atoms, polyenes and cyclic olefins.

[Ka 1]

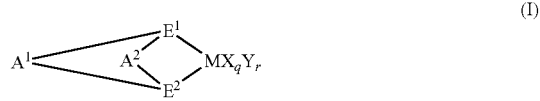

(I)

In Formula (I) described above, M represents a metal element of the 3rd to 10th groups in the periodic table, and the specific examples thereof include titanium, zirconium, hafnium, yttrium, vanadium, chromium, manganese, nickel, cobalt, palladium and lanthanoid base metals.

Among them, titanium, zirconium and hafnium are suitable from the viewpoint of the olefin polymerization activity, and zirconium is most suitable from the viewpoints of a yield of a terminal vinylidene group and the catalyst activity.

$E^1$ and $E^2$ each represent a ligand selected from a substituted cyclopentadienyl group, an indenyl group, a substituted indenyl group, a heterocyclopentadienyl group, a substituted heterocyclopentadienyl group, an amide group (—N<), a phosphine group (—P<), a hydrocarbon group (>CR—, >C<) and a silicon-containing group (>SiR—, >Si<) (wherein R is hydrogen, a hydrocarbon group having 1 to 20 carbon atoms or a hetero atom-containing group), and they form a cross-linked structure via $A^1$ and $A^2$. $E^1$ and $E^2$ may be the same as or different from each other.

Above $E^1$ and $E^2$ are preferably a cyclopentadienyl group, a substituted cyclopentadienyl group, an indenyl group and a substituted indenyl group, and at least one of $E^1$ and $E^2$ is a cyclopentadienyl group, a substituted cyclopentadienyl group, an indenyl group or a substituted indenyl group.

X represents a σ-binding ligand, and when plural X are present, plural X may be the same or different and may be cross-linked with other X, $E^1$, $E^2$ or Y.

The specific examples of X include a halogen atom, a hydrocarbon group having 1 to 20 carbon atoms, an alkoxy group having 1 to 20 carbon atoms, an aryloxy group having 6 to 20 carbon atoms, an amide group having 1 to 20 carbon atoms, a silicon-containing group having 1 to 20 carbon atoms, a phosphide group having 1 to 20 carbon atoms, a sulfide group having 1 to 20 carbon atoms, an acyl group having 1 to 20 carbon atoms and the like.

The halogen atom includes a chlorine atom, a fluorine atom, a bromine atom and an iodine atom.

The hydrocarbon group having 1 to 20 carbon atoms includes, to be specific, alkyl groups such as methyl, ethyl, propyl, butyl, hexyl, cyclohexyl, octyl and the like; alkenyl groups such as vinyl, propenyl, cyclohexenyl and the like; arylalkyl groups such as benzyl, phenylethyl, phenylpropyl and the like; and aryl groups such as phenyl, tolyl, dimethylphenyl, trimethylphenyl, ethylphenyl, propylphenyl, biphenyl, naphthyl, methylnaphthyl, anthracenyl, phenanthonyl and the like.

Among them, alkyl groups such as methyl, ethyl and propyl and aryl groups such as phenyl are preferred.

The alkoxy group having 1 to 20 carbon atoms includes alkoxy groups such as methoxy, ethoxy, propoxy, butoxy and the like, phenylmethoxy and phenylethoxy.

The aryloxy group having 6 to 20 carbon atoms includes phenoxy, methylphenoxy, dimethylphenoxy and the like.

The amide group having 1 to 20 carbon atoms includes alkylamide groups such as dimethylamide, diethylamide, dipropylamide, dibutylamide, dicyclohexylamide, methylethylamide and alkenylamide groups such as divinylylamide, dipropenylamide, dicyclohexenylamide and the like; arylalkylamide groups such as dibenzylamide, phenylethylamide, phenylpropylamide and the like; and arylamide groups such as diphenylamide, dinaphthylamide and the like.

The silicon-containing group having 1 to 20 carbon atoms includes monohydrocarbon-substituted silyl groups such as methylsilyl, phenylsilyl and the like; dihydrocarbon-substituted silyl groups such as dimethylsilyl, diphenylsilyl and the like; trihydrocarbon-substituted silyl groups such as trimethylsilyl, triethylsilyl, tripropylsilyl, tricyclohexenylsilyl, triphenylsilyl, dimethylphenylsilyl, methyldiphenylsilyl, tritolylsilyl, trinaphthylsilyl and the like; hydrocarbon-substituted silyl ether groups such as trimethylsilyl ether and the like; silicon-substituted alkyl groups such as trimethylsilylmethyl and the like; and silicon-substituted aryl groups such as trimethylsilylphenyl and the like.

Among them, trimethylsilylmethyl and phenyldimethylsilyl ethyl are preferred.

The phosphide group having 1 to 20 carbon atoms includes dialkyl phosphide groups such as dimethyl phosphide, diethyl phosphide, dipropyl phosphide, dibutyl phosphide, dihexyl phosphide, dicyclohexyl phosphide, dioctyl phosphide and the like; and diaryl phosphide groups such as dibenzyl phosphide, diphenyl phosphide, dinaphthyl phosphide and the like.

The sulfide group having 1 to 20 carbon atoms includes alkyl sulfide groups such as methyl sulfide, ethyl sulfide, propyl sulfide, butyl sulfide, hexyl sulfide, cyclohexyl sulfide, octyl sulfide and the like; alkenyl sulfide groups such as vinyl sulfide, propenyl sulfide, cyclohexenyl sulfide and the like; arylalkyl sulfide groups such as benzyl sulfide, phenylethyl sulfide, phenylpropyl sulfide and the like; and aryl sulfide groups such as phenyl sulfide, tolyl sulfide, dimethylphenyl sulfide, trimethylphenyl sulfide, ethylphenyl sulfide, propylphenyl sulfide, biphenyl sulfide, naphthyl sulfide, methylnaphthyl sulfide, anthracenyl sulfide, phenanthonyl sulfide and the like.

The acyl group having 1 to 20 carbon atoms includes alkylacyl groups such as formyl, acetyl, propionyl, butylyl, valelyl, palmitoyl, stearoyl, oleoyl and the like; arylacyl groups such as benzoyl, toluoyl, salicyloyl, cinnamoyl, naphthoyl, phthaloyl and the like; oxalyl, malonyl, succinyl and the like which are derived respectively from dicarboxylic acids such as oxalic acid, malonic acid, succinic acid and the like.

On the other hand, Y represents a Lewis base, and when plural Y are present, plural Y may be the same or different and may be cross-linked with other X, $E^1$, $E^2$ or X.

The specific examples of Y include amines, ethers, phosphines, thioethers and the like.

The amines include amines having 1 to 20 carbon atoms, and they include, to be specific, alkylamines such as methylamine, ethylamine, propylamine, butylamine, cyclohexylamine, methylethylamine, dimethylamine, diethylamine, dipropylamine, dibutylamine, dicyclohexylamine, methylethylamine and the like; alkenylamines such as vinylamine, propenylamine, cyclohexenylamine, divinylamine, dipropenylamine, diycohexenylamine and the like; arylalkylamines such as phenylamine, phenylethylamine, phenylpropylamine and the like; and arylamines such as diphenylamine, dinaphthylamine and the like.

The ethers include aliphatic single ether compounds such as methyl ether, ethyl ether, propyl ether, isopropyl ether, butyl ether, isobutyl ether, n-amyl ether, isoamyl ether and the like; aliphatic mixed ether compounds such as methyl ethyl ether, methyl propyl ether, methyl isopropyl ether, methyl n-amyl ether, methyl isoamyl ether, ethyl propyl ether, ethyl isopropyl ether, ethyl butyl ether, ethyl isobutyl ether, ethyl n-amyl ether, ethyl isoamyl ether and the like; aliphatic unsaturated ether compounds such as vinyl ether, allyl ether, methyl vinyl ether, methyl allyl ether, ethyl vinyl ether, ethyl allyl ether and the like; aromatic ether compounds such as anisole, phenetole, phenyl ether, benzyl ether, phenyl benzyl ether, α-naphthyl ether, β-naphthyl ether and the like; and cyclic ether compounds such as ethylene oxide, propylene oxide, trimethylene oxide, tetrahydrofuran, dioxane and the like.

The phosphines include phosphines having 1 to 20 carbon atoms.

They include, to be specific, alkylphosphines including monohydrocarbon-substituted phosphines such as methylphosphine, ethylphosphine, propylphosphine, butylphosphine, hexylphosphine, cyclohexylphosphine, octylphosphine and the like; dihydrocarbon-substituted phosphines such as dimethylphosphine, diethylphosphine, dipropylphosphine, dibutylphosphine, dihexylphosphine, dicyclohexylphosphine, dioctylphosphine and the like; and trihydrocarbon-substituted phosphines such as trimethylphosphine, triethylphosphine, tripropylphosphine, tributylphosphine, trihexylphosphine, tricyclohexylphosphine, trioctylphosphine and the like; monoalkenylphosphines such as vinylphosphine, propenylphosphine, cyclohexenylphosphine and the like and dialkenylphosphines obtained by substituting hydrogen atoms of phosphines with two alkenyls; trialkenylphosphines obtained by substituting hydrogen atoms of phosphines with three alkenyls; arylphosphines including arylalkylphosphines such as benzylphosphine, phenylethylphosphine, phenylpropylphosphine and the like; diarylalkylphosphines or aryldialkylphosphines obtained by substituting hydrogen atoms of phosphines with three groups of aryls or alkenyls; phenylphosphine, tolylphosphine, dimethylphenylphosphine, trimethylphenylphosphine, ethylphenylphosphine, propylphenylphosphine, biphenylphosphine, naphthylphosphine, methylnaphthylphosphine, anthracenylphosphine, phenanthonylphosphine; di(alkylaryl)phosphines obtained by substituting hydrogen atoms of phosphines with two alkylaryls; and tri(alkylaryl)phosphines obtained by substituting hydrogen atoms of phosphines with three alkylaryls. The thioethers include the sulfides described above.

Next, $A^1$ and $A^2$ are divalent cross-linking groups which combine two ligands and represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$—, wherein $R^1$ represents a hydrogen atom, a halogen atom, a hydrocarbon group having 1 to 20 carbon atoms or a halogen-containing hydrocarbon group having 1 to 20 carbon atoms, and they may be the same as or different from each other; q represents an integer of 1 to 5 ((valence of M)−2), and r represents an integer of 0 to 3.

Among the above cross-linking groups, at least one of them is preferably a cross-linking group comprising a hydrocarbon group having at least one carbon atom.

The above cross-linking group includes, for example, a group represented by Formula (a):

[Ka 2]

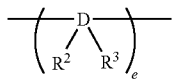

(a)

(D is a 14th element in the periodic table and includes, for example, carbon, silicon, germanium and tin; $R^2$ and $R^3$ each are a hydrogen atom or a hydrocarbon group having 1 to 20 carbon atoms, and they may be the same as or different from each other and may be combined with each other to form a cyclic structure; and e represents an integer of 1 to 4). The specific examples thereof include methylene, ethylene, ethylidene, propylidene, isopropylidene, cyclohexylidene, 1,2-cyclohexylene, vinylidene ($CH_2=C=$), dimethylsilylene, diphenylsilylene, methylphenylsilylene, dimethylgermilylene, dimethylstanylene, tetramethyldisilylene, diphenyldisilylene and the like. Among them, ethylene, isopropylidene and dimethylsilylene are suitable.

The specific examples of the double cross-linked transition metal compounds represented by Formula (I) include (1,2'-dimethylsilylene)(2,1'-dimethylsilylene)(3-methylcyclopentadienyl)(3'-methylcyclopentadienyl)zirconium dichloride, (1,2'-dimethylsilylene)(2,1'-isopropylidene)(3-methylcyclopentadienyl)(3'-methylcyclopentadienyl)zirconium dichloride, (1,2'-dimethylsilylene)(2,1'-ethylene)(3-methylcyclopentadienyl)(3'-methylcyclopentadienyl)zirconium dichloride, (1,2'-ethylene)(2,1'-methylene)(3-methylcyclopentadienyl)(3'-methylcyclopentadienyl)zirconium dichloride, (1,2'-ethylene)(2,1'-isopropylidene)(3-methylcyclopentadienyl)(3'-methylcyclopentadienyl)zirconium dichloride, (1,2'-methylene)(2,1'-methylene)(3-methylcyclopentadienyl)(3'-methylcyclopentadienyl)zirconium dichloride, (1,2'-methylene)(2,1'-isopropylidene)(3-methylcyclopentadienyl)(3'-methylcyclopentadienyl)zirconium dichloride, (1,2'-isopropylidene)(2,1'-isopropylidene)(3-methylcyclopentadienyl)(3'-methylcyclopentadienyl)zirconium dichloride, (1,2'-dimethylsilylene)(2,1'-dimethylsilylene)(3,4-dimethylcyclopentadienyl)(3',4'-dimethylcyclopentadienyl) zirconium dichloride, (1,2'-dimethylsilylene)(2,1'-isopropylidene)(3,4-dimethylcyclopentadienyl)(3',4'-dimethylcyclopentadienyl)-zirconium dichloride, (1,2'-dimethylsilylene)(2,1'-ethylene)(3,4-dimethylcyclopentadienyl)(3',4'-dimethylcyclopentadienyl) zirconium dichloride, (1,2'-ethylene)(2,1'-methylene)(3,4-dimethylcyclopentadienyl)-(3',4'-dimethylcyclopentadienyl)zirconium dichloride, (1,2'-ethylene)(2,1'-isopropylidene)(3,4-dimethylcyclopentadienyl)-(3',4'-dimethylcyclopentadienyl)zirconium dichloride, (1,2'-methylene)(2,1'-methylene)(3,4-dimethylcyclopentadienyl)-(3',4'-dimethylcyclopentadienyl)zirconium dichloride, (1,2'-methylene)(2,1'-isopropylidene)(3,4-dimethylcyclopentadienyl)-(3',4'-dimethylcyclopentadienyl) zirconium dichloride, (1,2'-isopropylidene)(2,1'-isopropylidene)(3,4-dimethylcyclopentadienyl)(3',4'-dimethylcyclopentadienyl)-zirconium dichloride, (1,2'-dimethylsilylene)(2,1'-dimethylsilylene)(3-methyl-5-ethylcyclopentadienyl)(3'-methyl-5'-ethylcyclopentadienyl) zirconium dichloride, (1,2'-dimethylsilylene)(2,1'-dimethylsilylene)(3-methyl-5-ethylcyclopentadienyl)(3'-methyl-5'-ethylcyclopentadienyl)zirconium dichloride, (1,2'-dimethylsilylene)(2,1'-dimethylsilylene)(3-methyl-5-isopropylcyclopentadienyl)(3'-methyl-5'-isopropylcyclopentadienyl)zirconium dichloride, (1,2'-dimethylsilylene)(2,1'-dimethylsilylene)(3-methyl-5-n-butylcyclopentadienyl)(3'-methyl-5'-n-butylcyclopentadienyl)-zirconium dichloride, (1,2'-dimethylsilylene)(2,1'-dimethylsilylene)(3-methyl-5-phenylcyclopentadienyl)(3'-methyl-5'-phenylcyclopentadienyl)zirconium dichloride, (1,2'-dimethylsilylene)(2,1'-isopropilydene)(3-methyl-5-ethylcyclopentadienyl)(3'-methyl-5'-ethylcyclopentadienyl)-zirconium dichloride, (1,2'-dimethylsilylene)(2,1'-isopropilydene)(3-methyl-5-isopropylcyclopentadienyl)(3'-methyl-5'-isopropylcyclopentadienyl)zirconium dichloride, (1,2'-dimethylsilylene)(2,1'-isopropilydene)(3-methyl-5-n-butylcyclopentadienyl)(3'-methyl-5'-n-butylcyclopentadienyl)-zirconium dichloride, (1,2'-dimethylsilylene)(2,1'-isopropilydene)(3-methyl-5-phenylcyclopentadienyl)(3'-methyl-5'-phenylcyclopentadienyl)zirconium dichloride, (1,2'-dimethylsilylene)(2,1'-ethylene)(3-methyl-5-ethylcyclopentadienyl)(3'-methyl-5'-ethylcyclopentadienyl)zirconium dichloride, (1,2'-dimethylsilylene)(2,1'-ethylene)(3-methyl-5-isopropylcyclopentadienyl)(3'-methyl-5'-isopropylcyclopentadienyl)zirconium dichloride, (1,2'-dimethylsilylene)(2,1'-ethylene)(3-methyl-5-n-butylcyclopentadienyl)(3'-methyl-5'-n-butylcyclopentadienyl)-zirconium dichloride, (1,2'-dimethylsilylene)(2,1'-ethylene)(3-methyl-5-phenylcyclopentadienyl)(3'-methyl-5'-phenylcyclopentadienyl)zirconium dichloride, (1,2'-dimethylsilylene)(2,1'-methylene)(3-methyl-5-ethylcyclopentadienyl)(3'-methyl-5'-ethylcyclopentadienyl)-zirconium dichloride, (1,2'-dimethylsilylene)(2,1'-methylene)(3-methyl-5-isopropylcyclopentadienyl)(3'-methyl-5'-isopropylcyclopentadienyl)zirconium dichloride, (1,2'-dimethylsilylene)(2,1'-methylene)(3-methyl-5-n-butylcyclopentadienyl) (3'-methyl-5'-n-butylcyclopentadienyl) zirconium dichloride, (1,2'-dimethylsilylene)(2,1'-methylene)(3-methyl-5-phenylcyclopentadienyl)(3'-methyl-5'-phenylcyclopentadienyl)zirconium dichloride, (1,2'-ethylene)(2,1'-methylene)(3-methyl-5-isopropylcyclopentadienyl)(3'-methyl-5'-isopropylcyclopentadienyl)zirconium dichloride, (1,2'-ethylene)(2,1'-isopropilydene)(3-methyl-5-isopropylcyclopentadienyl)(3'-methyl-5'-isopropylcyclopentadienyl)zirconium dichloride, (1,2'-methylene)(2,1'-methylene)(3-methyl-5-isopropylcyclopentadienyl)(3'-methyl-5'-isopropylcyclopentadienyl)zirconium dichloride, (1,2'-methylene)(2,1'-isopropilydene)(3-methyl-5-isopropylcyclopentadienyl)(3'-methyl-5'-isopropylcyclopentadienyl)zirconium dichloride and the like. Further, they include compounds obtained by substituting zirconium in the above compounds with titanium or hafnium and compounds represented by Formula (II) described later.

Also, they may be similar compounds of metal elements of the other groups.

They are preferably the transition metal compounds of the 4th group in the periodic table, and among them, the compounds of zirconium are preferred.

Among the transition metal compounds represented by Formula (I) described above, the compounds represented by Formula (II) are preferred:

[Ka3]

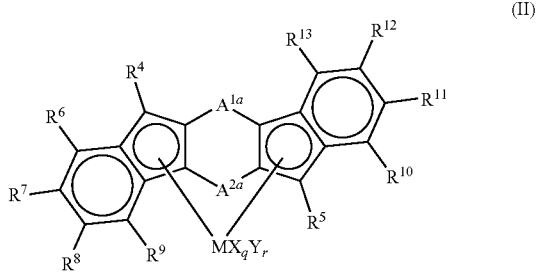

(II)

In Formula (II) described above, M represents a metal element of the 3rd to 10th groups in the periodic table, and $A^{1a}$ and $A^{2a}$ each represent a cross-linking group represented by Formula (a) in Formula (I) described above and are preferably $CH_2$, $CH_2CH_2$, $(CH_3)_2C$, $(CH_3)_2C(CH_3)_2C$, $(CH_3)_2Si$ and $(C_6H_5)_2Si$. $A^{1a}$ and $A^{2a}$ may be the same as or different from each other.

$R^4$ to $R^{13}$ each represent a hydrogen atom, a halogen atom, a hydrocarbon group having 1 to 20 carbon atoms, a halogen-containing hydrocarbon group having 1 to 20 carbon atoms, a silicon-containing group or a hetero atom-containing group.

The halogen atom, the hydrocarbon group having 1 to 20 carbon atoms and the silicon-containing group include the same ones as explained in Formula (I) described above.

The hydrocarbon group having 1 to 20 carbon atoms includes p-fluorophenyl, 3,5-difluorophenyl, 3,4,5-trifluorophenyl, pentafluorophenyl, 3,5-bis(trifluoro)phenyl, fluorobutyl and the like.

The hetero atom-containing group includes hetero atom-containing hydrocarbon groups having 1 to 20 carbon atoms and includes, to be specific, nitrogen-containing groups such as dimethylamino, diethylamino, diphenylamino and the like; sulfur-containing groups such as phenyl sulfide, methyl sulfide and the like; phosphorus-containing groups such as dimethylphosphino, diphenylphosphino and the like; and oxygen-containing groups such as methoxy, ethoxy, phenoxy and the like.

Among them, $R^4$ and $R^5$ are preferably groups containing hetero atom atoms such as halogen, oxygen, silicon and the like since they have a high polymerization activity.

$R^6$ to $R^{13}$ are preferably a hydrogen atom or a hydrocarbon group having 1 to 20 carbon atoms.

X and Y are the same as in Formula (I), wherein q is an integer of 1 to 5 and represents [(valence of M)−2], and r represents an integer of 0 to 3.

When both indenyl groups are the same in the double cross-linked transition metal compounds represented by Formula (II) described above, the transition metal compounds of the 4th group in the periodic table include (1,2'-dimethylsilylene)(2,1'-dimethylsilylene)bis(indenyl) zirconium dichloride, (1,2'-dimethylsilylene)(2,1'-dimethylsilylene)-bis(3-methylindenyl)zirconium dichloride, (1,2'-dimethylsilylene)(2,1'-dimethylsilylene)bis(3-ethylindenyl)zirconium dichloride, (1,2'-dimethylsilylene)(2,1'-dimethylsilylene)bis(3-isopropylindenyl)zirconium dichloride, (1,2'-dimethylsilylene)(2,1'-dimethylsilylene)bis(3-trimethylsilylmethylindenyl)zirconium dichloride, (1,2'-dimethylsilylene)(2,1'-dimethylsilylene)bis(3-butylindenyl)zirconium dichloride, (1,2'-dimethylsilylene)(2,1'-dimethylsilylene)bis(4-methylindenyl)zirconium dichloride, (1,2'-dimethylsilylene)(2,1'-dimethylsilylene)bis(4,7-dimethylindenyl)zirconium dichloride, (1,2'-dimethylsilylene)(2,1'-dimethylsilylene)bis(5,6-dimethylindenyl)zirconium dichloride, (1,2'-dimethylsilylene)(2,1'-dimethylsilylene)bis(3-ethoxymethylindenyl)zirconium dichloride, (1,2'-dimethylsilylene)(2,1'-dimethylsilylene)bis(3-ethoxyethylindenyl)zirconium dichloride, (1,2'-dimethylsilylene)(2,1'-dimethylsilylene)bis(3-methoxymethylindenyl)zirconium dichloride, (1,2'-dimethylsilylene)(2,1'-dimethylsilylene)bis(3-methoxyethylindenyl) zirconium dichloride, (1,2'-phenylmethylsilylene)(2,1'-phenylmethylsilylene)bis(indenyl)zirconium dichloride, (1,2'-phenylmethylsilylene)(2,1'-phenylmethylsilylene)bis(3-methylindenyl)zirconium dichloride, (1,2'-dimethylsilylene)(2,1'-isopropylidene)bis(indenyl)zirconium dichloride, (1,2'-dimethylsilylene)(2,1'-isopropylidene)bis(3-methylindenyl)zirconium dichloride, (1,2'-dimethylsilylene)(2,1'-isopropylidene)bis(3-isopropylindenyl)zirconium dichloride, (1,2'-dimethylsilylene)(2,1'-isopropylidene)bis(3-n-butylindenyl)-zirconium dichloride, (1,2'-dimethylsilylene)(2,1'-isopropylidene)bis(3-trimethylsilylmethylindenyl)zirconium dichloride, (1,2'-dimethylsilylene)(2,1'-isopropylidene)bis(3-trimethylsilylindenyl)zirconium dichloride, (1,2'-dimethylsilylene)(2,1'-isopropylidene)bis(3-phenylindenyl)-zirconium dichloride, (1,2'-dimethylsilylene)(2,1'-methylene)bis(indenyl)zirconium dichloride, (1,2'-dimethylsilylene)(2,1'-methylene)bis(3-methylindenyl)-zirconium dichloride, (1,2'-dimethylsilylene)(2,1'-methylene)bis(3-isopropylindenyl)zirconium dichloride, (1,2'-dimethylsilylene)(2,1'-methylene)bis(3-n-butylindenyl)-zirconium dichloride, (1,2'-dimethylsilylene)(2,1'-methylene)bis(3-trimethylsilylmethylindenyl)zirconium dichloride, (1,2'-dimethylsilylene)(2,1'-methylene)bis(3-trimethylsilylindenyl)zirconium dichloride, (1,2'-diphenylsilylene)(2,1'-methylene)bis(indenyl)zirconium dichloride, (1,2'-diphenylsilylene)(2,1'-methylene)bis(3-methylindenyl)zirconium dichloride, (1,2'-diphenylsilylene)-(2,1'-methylene)bis(3-n-butylindenyl)zirconium dichloride, (1,2'-diphenylsilylene)(2,1'-methylene)bis(3-trimethylsilylmethylindenyl)zirconium dichloride, (1,2'-diphenylsilylene)(2,1'-methylene)bis(3-trimethylsilylindenyl)-zirconium dichloride and the like. Further, they include compounds obtained by substituting zirconium in the above compounds with titanium or hafnium. However, they shall not be restricted to the above compounds.

Also, they may be similar compounds of metal elements of the other groups.

They are preferably the transition metal compounds of the 4th group in the periodic table, and among them, the compounds of zirconium are preferred.

On the other hand, in a case in which $R^5$ is a hydrogen atom and in which $R^4$ is not a hydrogen atom in the double cross-linked transition metal compounds represented by Formula (II) described above, the transition metal compounds of the 4th group in the periodic table include (1,2'-dimethylsilylene) (2,1'-dimethylsilylene)(indenyl)(3-trimethylsilylmethylindenyl)zirconium dichloride, (1,2'-dimethylsilylene)(2,1'-dimethylsilylene)(indenyl)(3-methylindenyl)zirconium dichloride, (1,2'-dimethylsilylene)(2,1'-dimethylsilylene)(indenyl)(3-trimethylsilylindenyl)zirconium dichloride, (1,2'-dimethylsilylene)(2,1'-dimethylsilylene) (indenyl)(3-phenylindenyl)zirconium dichloride, (1,2'-dimethylsilylene)(2,1'-dimethylsilylene)(indenyl)(3-benzylindenyl)zirconium dichloride, (1,2'-dimethylsilylene)(2,1'-dimethylsilylene)(indenyl)(3-neopentylindenyl)zirconium dichloride, (1,2'-dimethylsilylene)(2,1'-dimethylsilylene)(indenyl)(3-phenethylindenyl)zirconium dichloride, (1,2'-ethylene)(2,1'-ethylene)(indenyl)(3-trimethylsilylmethylindenyl) zirconium dichloride, (1,2'-ethylene)(2,1'-ethylene)(indenyl)

(3-methylindenyl)zirconium dichloride, (1,2'-ethylene)(2,1'-ethylene)(indenyl)(3-trimethylsilylindenyl)zirconium dichloride, (1,2'-ethylene)(2,1'-ethylene)(indenyl)(3-phenylindenyl)zirconium dichloride, (1,2'-ethylene)(2,1'-ethylene)(indenyl)(3-benzylindenyl)zirconium dichloride, (1,2'-ethylene)(2,1'-ethylene)(indenyl)(3-neopentylindenyl)zirconium dichloride, (1,2'-ethylene)(2,1'-ethylene)(indenyl)(3-phenethylindenyl)zirconium dichloride and the like. Further, they include compounds obtained by substituting zirconium in the above compounds with titanium or hafnium. However, they shall not be restricted to the above compounds.

Also, they may be similar compounds of metal elements of the other groups.

They are preferably the zirconium transition metal compounds of the 4th group in the periodic table, and among them, the compounds of zirconium are preferred.

The compound capable of being reacted with the transition metal compound (B) which constitutes the catalyst used in the present invention to form an ionic complex is preferably a borate compound from the viewpoints that a high purity terminal unsaturated olefin base polymer having a relatively low molecular weight is obtained and that the catalyst is provided with a high reactivity.

The borate compound includes triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenyl)borate, benzyl(tri-n-butyl)ammonium tetrakis(pentafluorophenyl)borate, methyldiphenylammonium tetrakis(pentafluorophenyl)borate, triphenyl(methyl) ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanolpyridinium) tetrakis(pentafluorophenyl)borate, benzyl(2-cyanolpyridinium) tetrakis(pentafluorophenyl)borate, methyl(4-cyanolpyridinium) tetrakis(pentafluorophenyl)borate, triphenylphosphonium tetrakis(pentafluorophenyl)borate, dimethylanilinium tetrakis[bis(3,5-ditrifluoromethyl)phenyl]borate, ferrocenium tetraphenylborate, silver tetraphenylborate, trityl tetraphenylborate, tetraphenyporphyrinmanganese tetraphenylborate, triphenylcarbenium tetrakis(pentafluorophenyl)borate, methylanilinium tetrakis(perfluorophenyl)borate, ferrocenium tetrakis(pentafluorophenyl)borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis(pentafluorophenyl)borate, tetraphenyporphyrinmanganese tetrakis(pentafluorophenyl)borate, silver tetrafluoroborate and the like. They can be used alone or in combination of two or more kinds thereof. When a mole ratio (hydrogen/the transition metal compound) of hydrogen to the transition metal compound described later is 0, dimethylanilinium tetrakis(pentafluorophenyl)borate, triphenylcarbenium tetrakis(pentafluorophenyl)borate, methylanilinium tetrakis(perfluorophenyl)borate and the like are preferred.

The catalyst used in the production process of the present invention may be combination of the component (A) and the component (B) each described above, and in addition to the component (A) and the component (B), an organic aluminum compound may be added as a component (C).

The organic aluminum compound of the component (C) includes trimethylaluminum, triethylaluminum, triisopropylaluminum, triisobutylaluminum, tri-n-hexylaluminum, tri-n-octylaluminum, dimethylaluminum chloride, diethylaluminum chloride, methylaluminum dichloride, ethylaluminum dichloride, dimethylaluminum fluoride, diisobutylaluminum hydride, diethylaluminum hydride, ethylaluminum sesquichloride and the like.

The above organic aluminum compounds may be used alone or in combination of two or more kinds thereof.

Among the above compounds, trialkylaluminums such as trimethylaluminum, triethylaluminum, triisopropylaluminum, triisobutylaluminum, tri-n-hexylaluminum, tri-n-octylaluminum and the like are preferred in the present invention, and triisobutylaluminum, tri-n-hexylaluminum and tri-n-octylaluminum are more preferred.

A use amount of the component (A) is usually $0.1 \times 10^{-6}$ to $1.5 \times 10^{-5}$ mole/L, preferably $0.15 \times 10^{-6}$ to $1.3 \times 10^{-5}$ mole/L, more preferably $0.2 \times 10^{-6}$ to $1.2 \times 10^{-5}$ mole/L and particularly preferably $0.3 \times 10^{-6}$ to $1.0 \times 10^{-5}$ mole/L.

If a use amount of the component (A) is $0.1 \times 10^{-6}$ mole/L or more, the catalyst activity is sufficiently exerted, and if it is $1.5 \times 10^{-5}$ mole/L or less, polymerization heat can readily be removed.

A use ratio (A)/(B) of the component (A) to the component (B) is preferably 10/1 to 1/100, more preferably 2/1 to 1/10 in terms of a mole ratio.

If (A)/(B) falls in a range of 10/1 to 1/100, an effect of the catalyst is obtained, and the catalyst cost per unit mass of the polymer can be suppressed.

Further, boron is not likely to be present in the reactive polyolefin I and the reactive polyolefin II targeted in a large amount.

A use ratio (A)/(C) of the component (A) to the component (C) is preferably 1/1 to 1/10000, more preferably 1/5 to 1/2000 and further preferably 1/10 to 1/1000 in terms of a mole ratio.

Use of the component (C) makes it possible to enhance the polymerization activity per transition metal. If (A)/(C) falls in a range of 1/1 to 1/10000, a balance between an addition effect of the component (C) and the economical efficiency is good, and aluminum is not likely to be present in the reactive polyolefin I and the reactive polyolefin II targeted in a large amount.

In the production process of the present invention, preliminary contact can be carried out as well by using the component (A) and the component (B) or the component (A), the component (B) and the component (C).

The preliminary contact can be carried out by bringing the component (A) into contact with, for example, the component (B). However, the method therefor shall not specifically be restricted, and publicly known methods can be used.

The above preliminary contact is effective for a reduction in the catalyst cost in terms of an improvement in the catalyst activity and a reduction in a use proportion of the component (B) which is a promoter.

The reactive polyolefin I and the reactive polyolefin II of the present invention contain preferably smaller amounts of the catalyst residues described above.

In particular, a content of the transition metal is 5 ppm by mass or less; a content of aluminum is 300 ppm by mass or less; and a content of boron is 5 ppm by mass or less.

The transition metal includes titanium, zirconium, hafnium and the like, and a total amount thereof is 5 ppm by mass or less.

A content of aluminum is preferably 280 ppm by mass or less.

The above metal components can be measured by means of an ICP (high frequency induction combination plasma spectral analysis) measuring equipment.

If the reactive polyolefin I and the reactive polyolefin II containing less catalyst residues are used, the graft copolymer obtained or the thermoplastic resin composition containing the above graft copolymer has a high purity and can be applied to the electric and electronic fields, and therefore it is preferred.

Polyolefins other than the reactive polyolefin I and the reactive polyolefin II of the present invention include polyolefins which are obtained by using a Ziegler catalyst, a metallocene catalyst and the like and which do not substantially contain an unsaturated group, and they are, for example, polyolefins containing no unsaturated group which are obtained by subjected reactive polyolefins containing an unsaturated group to hydrogenation treatment and polyolefins containing no unsaturated group which are produced without using a polyene component. To be more specific, they include the following polyolefins of (1) to (3):

(1) polyethylene resins such as high density polyethylene (HDPE), low density polyethylene (LDPE), L-LDPE and the like,
(2) polypropylene resins such as isotactic polypropylene, syndiotactic polypropylene, atactic polypropylene, copolymers comprising propylene, ethylene and at least one α-olefin having 4 to 12 carbon atoms, block polypropylene and the like and
(3) polymers comprising at least one α-olefin having 6 to 28 carbon atoms.

Among them, preferred are polyolefins constituted from the same α-olefin as in the reactive polyolefin I and the reactive polyolefin II used.

In a combination of the reactive polyolefins I and II of the present invention and polyolefins other than the reactive polyolefins, a form thereof includes a molten mixture of the reactive polyolefins I and II and the polyolefins other than the reactive polyolefins, a powdery mixture thereof, a dry blend mixture in the form of pellets and a mixture in the form of a solution prepared by dissolving them in a hydrocarbon solvent or in a suspension state produced by cooling or reprecipitating after dissolving.

A mixing ratio thereof is 20 to 100% by mass of the reactive polyolefins I and II and 0 to 80% by mass of the polyolefins other than the reactive polyolefins, preferably 30 to 100% by mass of the reactive polyolefins I and II and 0 to 70% by mass of the polyolefins other than the reactive polyolefins, more preferably 40 to 100% by mass of the reactive polyolefins I and II and 0 to 60% by mass of the polyolefins other than the reactive polyolefins and further preferably 50 to 100% by mass of the reactive polyolefins I and II and 0 to 50% by mass of the polyolefins other than the reactive polyolefins, If a content of the reactive polyolefins I and II is 20% by mass or more, an amount of the graft copolymer produced after graft copolymerization reaction is elevated, and therefore it is preferred.

From another point of view, when the graft copolymer or the thermoplastic resin composition (thermoplastic resin composition I) containing the above graft copolymer is used by adding to a thermoplastic resin of the same kind as that of the polyolefin other than the reactive polyolefins, the graft copolymer is readily dispersed in a whole part of the resulting composition (thermoplastic resin composition II) if the graft copolymer is present in the polyolefin other than the reactive polyolefins in a sufficiently large amount and dispersed in a good state, and therefore it is preferred.

Accordingly, if the polyolefin other than the reactive polyolefins accounts for 80% by mass or less, the above polyolefin comes to a suitable amount, and therefore it is preferred from the viewpoint of the dispersibility.

The monomers shown by [I] to [IV] in the present invention include the following compounds.

[I] Acrylic acid and derivatives thereof:
(1) acrylic acid
(2) acrylic esters such as methyl acrylate, ethyl acrylate, butyl acrylate, normal octyl acrylate, 2-ethylhexyl acrylate and the like; and long chain polyalkylene type glycols having a molecular weight of 30000 or less, such as polyethylene glycol monoacrylate, polyethylene glycol polypropylene glycol monoacrylate, poly(ethylene glycol-n-tetramethylene glycol) monoacrylate, propylene glycol polybutylene glycol monoacrylate, polypropylene glycol monoacrylate and the like,
(3) acrylic acid metal salts comprising acrylic acid and typical metal elements, such as sodium acrylate, potassium acrylate, magnesium acrylate, calcium acrylate and the like,
(4) acrylic esters containing oxygen, nitrogen, sulfur and silicon atoms in ester residues, for example, acrylic esters having a functional group, such as glycidyl acrylate, 2-hydroxyethyl acrylate, 2-hydroxypropyl acrylate, 2-hydroxy-3-phenoxypropyl acrylate, 4-hydroxybutyl acrylate, acryloyloxyethyl isocyanate, methacryloyloxyethyl isocyanate, 3-acryloxypropyltrimethoxysilane, 3-acryloxypropyltriethoxysilane and the like; and long chain polyalkylene glycols containing a hydroxyl group and having a molecular weight of 30000 or less, such as polyethylene glycol monoacrylate, polyethylene glycol polypropylene glycol acrylate, poly(ethylene glycol-n-tetramethylene glycol) monoacrylate, propylene glycol polybutylene glycol monoacrylate, polypropylene glycol monoacrylate and the like,
(5) acrylamide,
(6) N-substituted acrylamide containing oxygen, nitrogen, sulfur and silicon atoms in substituents, for example, N-substituted acrylamides such as N-methylacrylamide, N-ethylacrylamide, N-isopropylacrylamide, N-cyclohexylacrylamide, N,N-dimethylacrylamide, N,N-diethylacrylamide, N,N-dibutylacrylamide, N,N-dicyclohexylacrylamide, N-(2-hydroxyethyl)acrylamide, N-(2-hydroxypropyl)acrylamide, N,N-dimethylaminoethylacrylamide, N-methylolacrylamide and the like and
(7) acrylonitrile.

[II] Methacrylic acid and α-alkyl-substituted substances of acrylic acid (hereinafter, they shall be called collectively "methacrylic acids") and derivatives thereof:
Monomers having an alkyl group (preferably an alkyl group having 6 or less carbon atoms) such as methyl in an a position of the monomers of [I] described above.

[III] Vinyl esters and derivatives thereof or alkoxyvinylsilane, for example, vinyl esters, for example, vinyl acetate, vinyl propionate, vinyl isobutyrate, vinyl pivalate, vinyl undecanoate, vinyl palmitate and the like and derivatives thereof; alkoxyvinylsilane such as trimethoxyvinylsilane, triethoxyvinylsilane and the like.

[IV] Styrene including styrene and alkylstyrenes such as α-methylstyrene, p-methylstyrene, p-ethylstyrene, p-propylstyrene, p-isopropylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene, 3,5-dimethylstyrene and the like; alkoxystyrenes such as p-methoxystyrene, o-methoxystyrene, m-methoxystyrene and the like; halogenated styrenes such as p-chlorostyrene, m-chlorostyrene, o-bromostyrene, p-fluorostyrene, m-fluorostyrene, o-fluorostyrene, o-methyl-p-fluorostyrene and the like; trimethylsilylstyrene and vinyl benzoate.

At least one selected from [1] to [IV] described above can be used as the monomer.

The preferred monomer and combinations of the preferred monomers include the following ones.

All the compounds described above are preferred as [I] acrylic acid and the derivatives thereof, and all the compounds excluding the acrylic acid metal salts are particularly preferred.

Graft polymerization can be carried out only with [II] methacrylic acid and the derivatives thereof, but a graft polymerization amount of [II] methacrylic acid and the derivatives thereof is elevated by combining [I] acrylic acid and the derivatives thereof with [II] methacrylic acid and the derivatives thereof, and therefore it is preferred.

In particular, combinations of acrylic acid and acrylic esters with methacrylic acid and methacrylic esters are preferred.

A preferred mole ratio of [I] acrylic acid and the derivatives thereof to [II] methacrylic acid and the derivatives thereof falls in a range of 0.1 to 2, preferably 0.2 to 1.5, more preferably 0.3 to 1.2 and further preferably 0.5 to 1.0 in terms of [I]/[II] (mole ratio).

If [I]/[II] (mole ratio) is 0.1 or more, a graft polymerization amount of [II] methacrylic acid and the derivatives thereof is elevated, and if it is 2 or less, a copolymer comprising [I] acrylic acid and the derivatives thereof/[II] methacrylic acid and the derivatives thereof which does not participate in graft polymerization is not by-produced. Accordingly, both are preferred.

Graft polymerization can be carried out only with styrene and the derivatives thereof, but a graft polymerization amount of styrene and the derivatives thereof is elevated by combining [I] acrylic acid and the derivatives thereof with [IV] styrene and the derivatives thereof, and therefore it is preferred.

In particular, combinations of acrylic acid and acrylic esters with styrene and the derivatives thereof are preferred.

A preferred mole ratio of [I] acrylic acid and the derivatives thereof to [IV] styrene and the derivatives thereof falls in a range of 0.1 to 2, preferably 0.2 to 1.5, more preferably 0.3 to 1.2 and further preferably 0.5 to 1.0 in terms of [I]/[IV] (mole ratio).

If [I]/[IV] (mole ratio) is 0.1 or more, a graft polymerization amount of [IV] styrene and the derivatives thereof is elevated, and if it is 2 or less, a copolymer comprising [I] acrylic acid and the derivatives thereof and [IV] styrene and the derivatives thereof which does not participate in the graft polymerization is not by-produced. Accordingly, both are preferred.

The monomer comprising the group A and the group B according to the present invention comprises the following compounds:

Group A:
[V] maleic anhydride and substitution products thereof,
[VI] maleic acid and esters thereof and
[VII] maleimide and substitution products thereof group B:
[I] acrylic acid and derivatives thereof,
[II] methacrylic acid and derivatives thereof,
[III] vinyl esters and derivatives thereof or alkoxyvinylsilane,
[IV] styrene and derivatives thereof and
[VIII] α-olefins The compounds represented by the formulas [I], [II], [III] and [IV] are the same as described above That is,
[V] maleic anhydride and substitution products thereof such as maleic anhydride, methylmaleic anhydride, dimethylmaleic anhydride, phenylmaleic anhydride, diphenylmaleic anhydride and the like,
[VI] maleic acid and esters thereof such as maleic acid, methyl maleic acid, dimethyl maleate, diethyl maleate, dibutyl maleate, monomethyl maleate and the like,
[VII] maleimide and substitution products thereof such as maleimide, N-alkyl-substituted maleimide, N-methylmaleimide, N-ethylmaleimide, N-phenylmaleimide and the like,
[VIII] α-olefins having 2 to 28 carbon atoms, such as ethylene, propylene, 1-butene, 1-hexene, 1-heptene, 1-octene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene and the like.

At least one selected respectively from the compounds of the group A and the compounds of the group B each described above can be used as the monomer.

The monomers of the group A described above have a small electron density in a double bond and therefore are monomers in which the monomers of the same kind are less liable to be polymerized. Accordingly, a content of the monomers of the group A is enhanced in the present invention by polymerizing them using in combination with the monomers of the group B. Further, in the present invention, a reactivity of the reactive polyolefin II can be enhanced by using the monomers of the group A, and therefore the effect that the graft copolymer can efficiently be produced is obtained as well.

Also, [VIII] the α-olefin having 2 to 28 carbon atoms is selected considering the relation of the graft copolymerization temperature with a boiling point thereof.

In melt graft copolymerization, the higher the temperature is, the more the handling is facilitated in terms of reaction operation by using α-olefin having a high boiling point.

Further, in graft copolymerization in which a solvent is used, gaseous α-olefins as well as α-olefins having a high boiling point can be used.

In the combination of the compounds of the group A and the compounds of the group B, the compounds of the group A/the compounds of the group B (mole ratio) falls in a range of usually 0.1 to 2, preferably 0.5 to 1.5, more preferably 0.8 to 1.2 and further preferably 0.9 to 1.1.

If the mole ratio is 0.1 or more, a graft polymerization amount of the compounds of the group A is elevated, and if it is 2 or less, a copolymer comprising the compounds of the group A and the compounds of the group B which does not participate in the graft polymerization is not by-produced. Accordingly, both are preferred.

The combination of the compounds of the group A and the group B is preferably a combination comprising [V] maleic anhydride and substitution products thereof in the group A and the compounds of the group B and more preferably a combination of [V] maleic anhydride and substitution products thereof in the group A with [I] acrylic acid and derivatives thereof, [III] vinyl esters and derivatives thereof or alkoxyvinylsilane and [VIII] α-olefins in the group B.

The radical initiator used for the graft polymerization in the present invention shall not specifically be restricted, and compounds suitably selected from radical initiators which have so far been publicly known, for example, various organic peroxides, azo base compounds and the like can be used. Both compounds are suitable radical initiators.

The organic peroxides include, for example, diacyl peroxides such as dibenzoyl peroxide, di-8,5,5-trimethylhexanoyl peroxide, dilauroyl peroxide, didecanoyl peroxide, di(2,4-dichlorobenzoyl) peroxide and the like, hydroperoxides such as t-butyl hydroperoxide, cumene hydroperoxide, diisopropylbenzene hydroperoxide, 2,5-dimethylhexane-2,5-dihydroperoxide and the like, dialkyl peroxides such as di-t-butyl peroxide, dicumyl peroxide, 2,5-dimethyl-2,5-di(t-butylperoxy)hexane, 2,5-dimethyl-2,5-di(t-butylperoxy)hexyl-3,α,α'-bis(t-butylperoxy)diisopropylbenzene and the like, peroxyketals such as 1,1-bis-t-butylperoxy-3,3,5-trimethylcyclohexane, 2,2-bis(t-butylperoxy)butane and the like, alkyl peresters such as t-butyl peroxyoctoate, t-butyl peroxypivalate, t-butyl peroxyneodecanoate, t-butyl peroxybenzoate and the like and peroxycarbonates such as di-2-ethylhexyl peroxydicarbonate, diisopropyl peroxydicarbonate, di-sec-butyl peroxydicarbonate, t-butylperoxyisopropyl carbonate and the like. Among them, the dialkyl peroxides are preferred.

The azo base compounds include azobisisobutyronitrile, azobisisovaleronitrile and the like.

The radical initiators may be used alone or in combination of two or more kinds thereof.

A use amount of the radical initiator in the graft polymerization shall not specifically be restricted and is suitably selected according to the desired physical properties of the graft copolymer or the thermoplastic resin composition containing the above graft copolymer.

The radical initiator is used in a range of 0.001 to 10 parts by mass, preferably 0.005 to 5 parts by mass based on 100 parts by mass of a combination of the reactive polyolefin I and the polyolefin other than the reactive polyolefin or a combination of the reactive polyolefin II and the polyolefin other than the reactive polyolefin.

A use amount of a monomer selected from [I] acrylic acid and derivatives thereof, [II]methacrylic acid and derivatives thereof, [III] vinyl esters and derivatives thereof or alkoxyvinylsilane and [IV] styrene and derivatives thereof or a monomer selected from the group A; [V] maleic anhydride and substitution products thereof, [VI] maleic acid and esters thereof and [VII] maleimide and substitution products thereof, the group B; [I] acrylic acid and derivatives thereof, [II] methacrylic acid and derivatives thereof, [III] vinyl esters and derivatives thereof or alkoxyvinylsilane, [IV] styrene and derivatives thereof and [VIII] α-olefins is selected in a range of 0.2 to 300 parts by mass according to the desired physical properties of the graft copolymer or the thermoplastic resin composition containing the above graft copolymer.

A use amount thereof falls in a range of preferably 1 to 250 parts by mass, more preferably 5 to 200 parts by mass and further preferably 10 to 180 parts by mass.

If the use amount is 0.2 part by mass or more, an amount of the monomer copolymerized in the graft polymerization is elevated, and the functions such as the compatibility and the like are liable to be exerted. If it is 300 parts by mass or less, polymers which do not participate in the graft reaction are not by-produced. Accordingly, both are preferred.

The graft polymerization method shall not specifically be restricted, and the reactive polyolefin I or the reactive polyolefin II, the polyolefin other than the reactive polyolefin, the monomers described above and the radical initiator are reacted by melting and kneading them by means of a roll mill, a Banbury mixer, an extruding machine and the like, whereby the graft copolymer or the thermoplastic resin composition containing the above graft copolymer can be produced. The reaction conditions include a temperature of 60 to 140° C. and a time of 0.01 to 0.5 hour when the reactive polyolefin I is used, and they include a temperature of 40 to 140° C. and a time of 0.01 to 0.5 hour when the reactive polyolefin II is used. The graft polymerization method may be carried out under the presence of Lewis acid, and in this case, the temperature is preferably 40 to 140° C.

Also, the graft copolymer or the thermoplastic resin composition containing the above graft copolymer can be produced as well in a suitable organic solvent including a hydrocarbon base solvent such as butane, pentane, hexane, cyclohexane, toluene and the like, a halogenated hydrocarbon base solvent such as chlorobenzene, dichlorobenzene, trichlorobenzene and the like, liquefied α-olefin and the like or on the condition of the absence of a solvent. The reaction conditions include a temperature of 40 to 140° C., preferably 50 to 140° C. and a time of 0.1 to 10 hours when the reactive polyolefin I is used, and they include a temperature of 20 to 140° C., preferably 40 to 140° C. and a time of 0.1 to 10 hours when the reactive polyolefin II is used and when the polymerization is carried out under the coexistence of Lewis acid.

When the graft copolymerization is carried out on a high temperature condition usually used, a reduction in the molecular weight and the viscosity which is brought about by decomposition of the reactive polyolefins I and II and production of a gel by cross-linking reaction are liable to be caused. In the present invention, however, since the graft copolymerization is carried out on a condition of a relatively low temperature, a reduction in the molecular weight and the viscosity is prevented, and side reactions such as cross-linking reaction and the like do not proceed as well.

Lewis acid used for the graft polymerization of the present invention includes the following compounds:
(1) halides (chlorides, bromides, fluorides and iodides), alkyls (hydrocarbon groups having 1 to 20 carbon atoms) and halogenated alkyls of second group to fourth group elements in the periodic table and
(2) Lewis acids comprising aluminum, boron, zinc, tin, magnesium and calcium atoms.

The specific examples of the Lewis acids include magnesium chloride, calcium chloride, zinc chloride, boron trichloride, aluminum trichloride, gallium trichloride, silicon tetrachloride and compounds obtained by substituting chlorine atoms of the above compounds with a bromine atom and a fluorine atom, butylethylmagnesium, diethylzinc, trimethylaluminum, triethylaluminum, triisobutylaluminum, tri-n-hexylaluminum, trimethylboron, triethylboron, triethylgallium, trimethylgallium, diethylaluminum monochloride, ethylaluminum dichloride and ethylaluminum sesquichloride. Among them, zinc compounds, aluminum compounds and boron compounds are preferred.

In respect to a use amount of the Lewis acid in the graft polymerization, the Lewis acid/the monomer (mole/mole) is 0.01 to 1, preferably 0.05 to 1 and more preferably 0.1 to 0.5.

In this respect, the monomer means a monomer selected from [I] acrylic acid and derivatives thereof, [II] methacrylic acid and derivatives thereof, [III] vinyl esters and derivatives thereof or alkoxyvinylsilane and [IV] styrene and derivatives thereof, or a monomer selected from group A; [V] maleic anhydride and substitution products thereof, [VI] maleic acid and esters thereof and [VII] maleimide and substitution products thereof and group B; [I] acrylic acid and derivatives thereof, [II] methacrylic acid and derivatives thereof, [III] vinyl esters and derivatives thereof or alkoxyvinylsilane and [IV] styrene and derivatives thereof and [VIII] α-olefins.

If the Lewis acid/the monomer (mole/mole) is 0.01 or more, the graft rate is high, and if it is 1 or less, a Lewis acid residue does not have to be removed by deashing, so that coloring is not caused. Accordingly, both are preferred.

The Lewis acid is added before adding the radical initiator to carry out the graft polymerization reaction, or the Lewis acid which is brought in advance into contact with the monomers [I] to [VIII] is used to thereby carry out the graft polymerization reaction.

The graft copolymer which has a principal chain derived from at least one monomer selected from [I], [II], [III] and [IV] each described above and which has a side chain derived from a specific reactive polyolefin being a homopolymer of one monomer selected from α-olefins having 3 to 28 carbon atoms or a copolymer of two or more kinds thereof, or a copolymer of 90% by mass or more of at least one monomer selected from α-olefins having 3 to 28 carbon atoms and 10% by mass or less of ethylene, and the graft copolymer having a structure in which an unsaturated group of a chain terminal and/or a principal chain pendant in the reactive polyolefin II comprising at least one selected from α-olefins having 2 to 28 carbon atoms is introduced into a copolymerized chain derived from at least one monomer selected from the group A described above and at least one monomer selected from the group B described above, which are the graft copolymers of the present invention shall be described below.

A graft rate of the graft copolymer is usually 1 to 150% by mass, preferably 2 to 130% by mass and more preferably 5 to 100% by mass.

If the graft rate is 1% by mass or more, the side chains have an appropriate number, and the functions such as the compatibility, the adhesion and the like can sufficiently be exerted. If it is 150% by mass or less, the reactive polyolefin component is appropriate and can exert sufficiently the functions.

The graft rate can be measured in the following manner.

The monomers which do not participate in the graft polymerization and the soluble polymer components are dissolved in a solvent and removed, and the graft rate is calculated from a mass (W2) of the insoluble copolymer component and a mass (W1) of the reactive polyolefin used as the raw material in the following manner.

graft rate(% by mass)=(W2−W1)/W1×100

With respect to an alternative method, the graft rate can be determined from NMR measurement of the insoluble graft copolymer component by an ordinary method.

The graft copolymer has a limiting viscosity [η] of 0.01 to 2.5 dl/g, preferably 0.02 to 2.2 dl/g and more preferably 0.05 to 2.0 dl/g which is measured in decalin at 135° C.

If the limiting viscosity [η] is 0.01 dl/g or more, the functions such as the resin compatibility and the like are elevated, and if it is 2.5 dl/g or less, the dispersibility into the resins is enhanced. Accordingly, both are preferred.

The graft copolymer has a weight average molecular weight of usually 500 to 400000, preferably 700 to 350000, more preferably 1000 to 300000 and most preferably 1500 to 250000.

The graft copolymer has a molecular weight distribution (Mw/Mn) of usually 1.8 to 6, preferably 1.8 to 5 and more preferably 1.8 to 4. Also, use of the suitable reaction conditions, controlling of a reactivity of the unsaturated groups, controlling of the number of the terminal unsaturated groups per molecule in the reactive polyolefin I and controlling of a polyene amount of the reactive polyolefin II make it possible to inhibit side reactions other than the graft polymerization and reduce furthermore the molecular weight distribution, and the preferred molecular weight distribution is 1.5 to 4.

In determining a weight average molecular weight and a molecular weight distribution of the graft copolymer, the GPC method described above which has been explained for the reactive polyolefin I can be used.

Further, the graft copolymer of the present does not contain preferably a gel component.

Measuring Method of Gel Component:

A solvent dissolving both of a principal chain component and a side chain component of the graft copolymer is used, and a cage made of a stainless-made net of a 400 mesh (aperture size: 0.034 mm) in a glass-made separable flask equipped with a stirring device is charged with 50 mg of the graft copolymer and fixed to a stirring blade.

A solvent containing 0.1% by mass of an antioxidant (BHT) is added thereto, and the copolymer is dissolved at a boiling point for 4 hours while stirring.

After dissolving, the recovered cage is sufficiently dried under vacuum and weighed to thereby determine the insoluble part.

The gel component defined as the insoluble part is calculated from the following equation:

(residual amount (g) in mesh)/(amount (g) of charged sample)×100(unit: %)

The solvent includes paraxylene, toluene and the like.

Usually, in the equation described above, it is prescribed by a range of 0 to 1.5% by mass that the gel component is not contained.

Also, a sea island structure is present in a molded matter prepared by heating, melting, cooling and solidifying the graft copolymer of the present, and at least an island part having a particle diameter of 10 to 100 nm is contained therein.

The particle diameter is preferably 10 to 90 nm, more preferably 10 to 80 nm.

Evaluation Method of Sea Island Structure:

A film is prepared at a temperature of not lower than a melting point or a glass transition temperature of the graft copolymer by a hot press or a solvent casting method, and a sample subjected to ruthenium dyeing by an ordinary method is observed under a transmission type electron microscope (TEM) to confirm a particle diameter by image analysis or visually observing the photograph.

In the graft copolymer having a structure in which an unsaturated group of a chain terminal and/or a principal chain pendant in the reactive polyolefin II comprising at least one selected from α-olefins having 2 to 28 carbon atoms is introduced into a copolymerized chain derived from at least one monomer selected from the group A described above and at least one monomer selected from the group B described above, a mesopentad ratio [mmmm] of a propylene chain in the graft copolymer falls in a range of preferably 20 to 99 mole %, more preferably 30 to 98 mole % and further preferably 40 to 97 mole %.

The thermoplastic resin composition II of the present invention shall be described below. The thermoplastic resin composition II is a composition comprising the graft copolymer or the thermoplastic resin composition containing the above graft copolymer and other resins and the like.

The other resins and the like described above include thermoplastic resins, inorganic fillers and/or inorganic pigments, organic pigments and the like.

The thermoplastic resins include the following resins:
(1) polyethylenes: polyethylenes such as high density polyethylenes (HDPE), high pressure low density polyethylenes (LDPE) and the like: high density polyethylenes (HDPE), high pressure low density polyethylenes (LDPE) and the like
(2) ethylene/α-olefin copolymers: polyolefin base rubbers such as ethylene/propylene copolymers, ethylene/propylene/diene copolymers and the like; linear low density polyethylenes (L-LDPE) such as ethylene/butene copolymers, ethylene/hexene copolymers, ethylene/octene copolymers and the like
(3) ethylene/polar monomer copolymers: ethylene/vinyl acetate copolymers and saponified products thereof, ethylene/acrylic acid copolymers, ethylene/methyl methacrylate copolymers, ethylene/glycidyl methacrylate copolymers and the like
(4) polypropylenes: isotactic polypropylenes, syndiotactic polypropylenes, atactic polypropylenes, low to middle isotactic polypropylenes having a mesopentad ratio [mmmm] of 30 to 85 mole % and the like
(5) polypropylene copolymers: copolymerized polypropylenes comprising ethylene, butene, hexane, octene and the like as copolymerization components
(6) polybutenes: isotactic polybutene, low to middle isotactic polybutenes having a mesopentad ratio [mmmm] of 30 to 90 mole % and the like
(7) higher poly-α-olefins obtained from α-olefins having 16 to 28 carbon atoms
(8) polysiloxanes
(9) petroleum resins
(10) polystyrenes
(11) condensation polymers such as polyamides, polyesters and the like.

Among them, the polypropylenes and the polybutenes are preferred.

The inorganic fillers and/or inorganic pigments described above include silica, alumina, glass, quartz, kaolin, mica, talc, clay, alumina hydrate, wollastonite, iron powder, potassium titanate, titanium oxide, zinc oxide, silicon carbide, silicon nitride, calcium carbonate, carbon black, barium sulfate, boron bismuth vanadate, iron oxide, incinerated Fe/Cr, incinerated Cu/Cr, incinerated Co, Zn, Al and the like.

The organic pigments include dioxazine, benzimidazolone, anthraquinone, quinacridone, phthalocyanine, isoindolinone and the like.

Further, various resin additives such as antioxidants, UV absorbers, defogging agents and the like, process oils and the like may be blended.

In the thermoplastic resin composition II, the thermoplastic resin/the graft copolymer (mass part/mass part) added as the other resins described above is usually 100/0.1 to 100/50, preferably 100/0.5 to 100/45 and more preferably 100/1.0 to 100/40.

An amount of the graft copolymer is 0.1 part by mass or more, the modifying effect is large, and if it is 50 parts by mass or less, the physical properties of the resin component are enhanced.

The inorganic filler•pigment or the organic pigment/the graft copolymer (mass part/mass part) is usually 100/0.01 to 100/5000, preferably 100/0.05 to 100/4000 and more preferably 100/0.08 to 100/3000.

A mass part of the graft copolymer is 0.1 or more, the modifying effect is large, and if it exceeds 5000, an amount of the graft copolymer which does not participate in surface treatment of the inorganic filler is increased to reduce the physical properties, so that it is not preferred.

The composition ranges described above shall be explained in a more specific method in the following manner.

When the inorganic filler is subjected to surface treatment, the inorganic filler/the graft copolymer (mass part/mass part) is usually 100/0.05 to 100/20, preferably 100/0.1 to 100/15 and more preferably 100/0.5 to 100/10.

Further, when the master batch is prepared, it is usually 100/5 to 100/500, preferably 100/10 to 100/450 and more preferably 100/20 to 100/400.

The above surface treated-inorganic filler and master batch can be diluted and kneaded into the thermoplastic resin and the like by an ordinary method and used for producing various molded matters.

When the thermoplastic resin I is used in producing the thermoplastic resin composition II, it can be used in the same manner as shown above based on a net amount of the graft copolymer.

The composition described above can be produced by conventional melting and kneading such as melting and kneading by a batch system and the like by means of a monoaxial or biaxial melting and kneading or melting and extruding machine.

EXAMPLES

Next, the present invention shall be explained in further details with reference to examples, but the present invention shall by no means be restricted by these examples.

Production Example 1

Synthesis of Transition Metal Compound (1,2'-Dimethylsilylene)(2,1'-dimethylsilylene)-bis(3-trimethylsilylmethylindenyl)zirconium dichloride was synthesized in the following manner.

A Schlenk bottle was charged with 3.0 g (6.97 mmol) of a lithium salt of (1,2'-dimethylsilylene)(2,1'-dimethylsilylene)-bis(indene) and dissolved in 50 ml of THF (tetrahydrofuran), and the solution was cooled to −78° C.

Iodomethyltrimethylsilane 2.1 ml (14.2 mmol) was slowly dropwise added thereto, and the solution was stirred at room temperature for 12 hours.

The solvent was removed by distillation, and 50 ml of ether was added thereto. The solution was washed with a saturated ammonium chloride solution.

After separating the liquid, the organic phase was dried to remove the solvent, whereby 3.04 g (5.88 mmol) of (1,2'-dimethylsilylene)(2,1'-dimethylsilylene)-bis(3-trimethylsilylmethylindene) was obtained (yield: 84%).

Next, a Schlenk bottle was charged with 3.04 g (5.88 mmol) of (1,2'-dimethylsilylene)(2,1'-dimethylsilylene)-bis(3-trimethylsilylmethylindene) obtained above and 50 ml of ether under nitrogen flow.

The solution was cooled to −78° C., and a hexane solution (1.54M, 7.6 ml (1.7 mmol)) of n-BuLi was dropwise added thereto. The solution was heated to room temperature and stirred for 12 hours, and then ether was removed by distillation.

The solid matter thus obtained was washed with 40 ml of hexane, whereby 3.06 g (5.07 mmol) of the lithium salt was obtained in the form of an ether adduct (yield: 73%).

The results of measurement carried out by $^1$H-NMR (90 MHz, THF-d$_8$) are shown below:

δ: 0.04 (s, 18H, trimethylsilyl), 0.48 (s, 18H, dimethylsilyl), 1.10 (t, 6H, methyl), 2.59 (s, 4H, methylene), 3.38 (q, 4H, methylene), 6.2 to 7.7 (m, 8H, Ar—H).

The lithium salt obtained above was dissolved in 50 ml of toluene under nitrogen flow.

The solution was cooled to −78° C., and a toluene (20 ml) suspension of zirconium tetrachloride 1.2 g (5.1 mmol) which was cooled in advance to −78° C. was dropwise added thereto.

After dropwise added, the solution was stirred at room temperature for 6 hours. The solvent of the reaction liquid was removed by distillation.

The residue thus obtained was recrystallized from dichloromethane to thereby obtain 0.9 g (1.33 mmol) of (1,2'-dimethylsilylene)(2,1'-dimethylsilylene)-bis(3-trimethylsilylmethylindenyl)zirconium dichloride (yield: 26%).

The results of measurement carried out by $^1$H-NMR (90 MHz, CDCl$_3$) are shown below:

δ: 0.0 (s, 18H, trimethylsilyl), 1.02, 1.12 (s, 12H, dimethylsilylene), 2.51 (dd, 4H, methylene), 7.1 to 7.6 (m, 8H, Ar—H).

Production Example 2

Production (1) of Reactive Polypropylene

A stainless steel-made autoclave having a content volume of 1.4 L which was dried by heating was charged with 0.4 L of dried heptane, 1 ml of a heptane solution of triisobutylaluminum 0.5 mmol and 2 ml of a heptane slurry of dimethylaniliniumtetrakis(pentafluorophenyl) borate 1.5 μmol, and the mixture was stirred for 10 minutes while controlling at 50° C.

Further, 2 ml of a heptane slurry of (1,2'-dimethylsilylene)(2,1'-dimethylsilylene)-bis(3-trimethylsilylmethylindenyl)zirconium dichloride 0.5 μmol which was a transition metal compound complex prepared in Production Example 1 was added thereto.

Next, the temperature was elevated up to 70° C. while stirring, and a propylene gas was introduced thereinto up to 0.8 MPa at a full pressure.

The propylene gas was supplied by means of a pressure governor so that a pressure was constant during polymerization reaction to carry out polymerization for 120 minutes. Then, the solution was cooled to remove unreacted propylene by depressurization, and the content was taken out.

The content was dried in air and then further dried at 80° C. for 8 hours under reduced pressure to thereby obtain 123 g of a reactive polypropylene.

The results thereof are shown in Table 1.

Production Example 3

Production of Polypropylene

A stainless steel-made autoclave having a content volume of 1.4 L which was dried by heating was charged with 0.4 L of dried heptane, 1 ml of a heptane solution of triisobutylaluminum 1.0 mmol and methyl aluminoxane 2 mmol, and the mixture was stirred for 10 minutes while controlling at 50° C.

Further, 4 ml of a heptane slurry of (1,2'-dimethylsilylene)(2,1'-dimethylsilylene)-bis(3-trimethylsilylmethylindenyl)zirconium dichloride 2.0 μmol which was the transition metal compound complex prepared in Production Example 1 was added thereto.

Next, the temperature was elevated up to 60° C. while stirring, and hydrogen was pressurized at 0.1 MPa, followed by introducing a propylene gas thereinto up to 0.5 MPa.

The propylene gas was supplied by means of a pressure governor so that a pressure was constant during polymerization reaction to carry out polymerization for 60 minutes. Then, the solution was cooled to remove unreacted propylene by depressurization, and the content was taken out.

The content was dried in air and then further dried at 80° C. for 8 hours under reduced pressure to thereby obtain 72 g of polypropylene.

The results thereof are shown in Table 1.

Production Example 4

Synthesis of Transition Metal Compound (1,2'-Dimethylsilylene)(2,1'-dimethylsilylene)-(indenyl)(3-trimethylsilylmethylindenyl)zirconium dichloride was synthesized in the following manner.

A Schlenk bottle of 200 ml was charged with 50 ml of ether and 3.5 g (10.2 mmol) of (1,2'-dimethylsilylene)(2,1'-dimethylsilylene)bisindene under nitrogen flow, and a hexane solution (1.60 mole/liter, 12.8 ml) of n-butyllithium (n-BuLi) was dropwise added thereto at −78° C. After the solution was stirred at room temperature for 8 hours, the solvent was removed by distillation, and a solid matter obtained was dried under reduced pressure to thereby obtain 5.0 g of a white solid matter. This solid matter was dissolved in 50 ml of tetrahydrofuran (THF), and 1.4 ml of iodomethyltrimethylsilane was dropwise added thereto at room temperature. The solution was hydrolyzed with 10 ml of water, and the organic phase was extracted with 50 ml of ether. Then, the organic phase was dried, and the solvent was removed by distillation. Ether 50 ml was added thereto, and a hexane solution (1.6 mole/liter, 12.4 ml) of n-BuLi was dropwise added thereto at −78° C. Then, after the temperature was elevated to room temperature to stir the solution for 3 hours, ether was removed by distillation. A solid matter obtained was washed with 30 ml of hexane and then dried under reduced pressure. This solid matter 5.11 g was suspended in 50 ml of toluene, and 2.0 g (8.60 mmol) of zirconium tetrachloride suspended in 10 ml of toluene in another Schlenk bottle was added thereto. The solution was stirred at room temperature for 12 hours, and the solvent was removed by distillation. The residue was washed with 50 ml of hexane, and then it was recrystallized from 30 ml of dichloromethane to thereby obtain 1.2 g of a yellow fine crystal (yield: 25%).

Production Example 5

Production (2) of Reactive Polypropylene

A stainless steel-made autoclave having a content volume of 5 L which was dried by heating was charged with 2.5 L of dried heptane, 1.4 ml of a heptane solution of triisobutylaluminum 1.4 mmol and 2 ml of a heptane slurry of dimethylaniliniumtetrakis(pentafluorophenyl) borate 15.4 μmol, and the mixture was stirred for 10 minutes while controlling at 50° C.

Further, 6 ml of a heptane slurry of (1,2'-dimethylsilylene)(2,1'-dimethylsilylene)-(indenyl)(3-trimethylsilylmethylindenyl)zirconium dichloride 3.8 μmol which was the transition metal compound complex prepared in Production Example 4 was added thereto.

Further, after hydrogen was charged thereinto, the temperature was elevated up to 60° C. while stirring, and a propylene gas was introduced thereinto up to a partial pressure of 0.49 MPa.

The propylene gas was supplied by means of a pressure governor so that a pressure was constant during polymerization reaction to carry out polymerization for 100 minutes. Then, the solution was cooled to remove unreacted propylene by depressurization, and the content was taken out.

The content was dried in air and then further dried at 80° C. for 8 hours under reduced pressure to thereby obtain 525 g of polypropylene. The results thereof are shown in Table 1.

TABLE 1

| Production Example | Yield g | Terminal vinylidene mole % | [mmmm] mole % | Limiting viscosity (dl/g) | Weight average molecular weight Mw | Molecular weight distribution Mw/Mn | [mrm] mole % | Melting point ° C. |
|---|---|---|---|---|---|---|---|---|
| 2 | 123 | 98 | 43 | 0.85 | 116000 | 2.18 | 2.9 | 68.7 |
| 3 | 72 | 4 | 42 | 0.76 | 99000 | 2.02 | 2.8 | 66.1 |
| 5 | 525 | 96 | 55.2 | 0.40 | 43700 | 1.84 | — | 98.2 |

Example 1

A glass-made flask of 100 mL was charged with 2.0 g of the reactive polypropylene prepared in Production Example 2 and 40 ml of dehydrated toluene, and the polypropylene was dissolved at room temperature while stirring.

The flask was charged with 1.72 g of methyl acrylate, and 1 ml of toluene dissolving 10 mg of azobisisobutyronitrile was added thereto to react them at 70° C. for 4 hours.

After finishing the reaction, the reaction liquid was thrown into a large amount of methanol, and the polymer was washed, recovered and dried to obtain 2.88 g of a graft copolymer mixture.

This was finely dispersed in acetone to repeat washing and filtering three times at room temperature, and the insoluble part was dried to obtain 2.55 g of a graft copolymer. The results thereof are shown in Table 2.

Examples 2 to 4

Graft copolymers were obtained in the same manner as in Example 1, except that methyl acrylate was changed to 1.50 g of acrylic acid (Example 2), 1.28 g of n-butyl acrylate (Example 3) and 1.84 g of 2-ethylhexyl acrylate (Example 4). The results thereof are shown in Table 2.

Example 5

A glass-made flask of 100 mL was charged with 2.0 g of the reactive polypropylene prepared in Production Example 2 and 40 ml of dehydrated toluene, and the polypropylene was dissolved at room temperature while stirring. The flask was charged with 0.283 g of vinyl acetate and 0.317 g of maleic anhydride, and 1 ml of toluene dissolving 20 mg of azobisisobutyronitrile was added thereto to react them at 70° C. for 4 hours.

After finishing the reaction, the liquid part was removed by means of an evaporator, and then washing with water and filtrating were carried out three times. The insoluble part was dried to obtain 2.21 g of a graft copolymer. The results thereof are shown in Table 2.

The above graft copolymer was subjected to hot press at 230° C. and then cooled for 5 minutes by a cooling press (temperature: 25° C.) to prepare a sheet having a thickness of 100 μm.

A molded matter obtained was subjecting to ruthenium dyeing, and a photo thereof was taken through a transmission type electron microscope to obtain FIG. 1.

It was found from FIG. 1 that a sea island structure was present in the molded matter and that an island part having a particle diameter of 50 nm or less was present.

Examples 6 to 7

Graft copolymers were obtained in the same manner as in Example 5, except that a combination of vinyl acetate (0.283 g) and maleic anhydride (0.317 g) was changed to a combination of maleic anhydride (0.49 g) and 1-decene (1.50 g) (Example 6) and a combination of methyl acrylate (0.86 g) and glycidyl methacrylate (1.28 g) (Example 7). The results thereof are shown in Table 2.

Example 8

Graft copolymerization was carried out in the same manner as in Example 6, except that in Example 6, after adding maleic anhydride and 1-decene, 2 ml of a toluene solution of triisobutylaluminum 2 mmol was added.

A graft copolymer prepared was extracted three times with acetone, and then it was washed with a methanol/diluted hydrochloric acid mixed solution and methanol and dried to obtain a refined graft copolymer. The results thereof are shown in Table 2.

Example 9

Graft reaction was carried out in the same manner as in Example 1 to obtain a thermoplastic resin composition containing a graft copolymer, except that in Example 1, 2.0 g of the polypropylene prepared in Production Example 3 in addition to 2.0 g of the reactive polypropylene prepared in Production Example 2 was added. The results thereof are shown in Table 2.

Example 10

Reaction and operation were carried out in the same manner as in Example 5, except that maleic anhydride was not used. The results thereof are shown in Table 2.

Example 11

Reaction and operation were carried out in the same manner as in Example 7, except that methyl acrylate was not used. The results thereof are shown in Table 2.

Example 12

A 500 mL separable flask equipped with a stirring device was charged with 100 g of the reactive polyolefin prepared in Production Example 5 and 67 ml of dehydrated toluene, and the polyolefin was dissolved at 70° C. while stirring. Maleic anhydride 15.7 g and acrylic acid 11.9 g were added thereto, and 20 ml of toluene dissolving 0.4 g of azobisisobutyronitrile was added thereto in 2 hours. After adding, they were reacted at 70° C. for 4 hours. After finishing the reaction, unreacted maleic anhydride and acrylic acid were removed at 85° C. under reduced pressure. As a result thereof, 128 g of a graft copolymer composition was obtained.

$^1$H-NMR analysis of the graft copolymer composition resulted in finding that 94.4% of a terminal vinylidene group disappeared and that almost all of the graft copolymer composition was the graft copolymer. The graft copolymer composition was finely dispersed in methanol to repeat washing and filtering three times at room temperature while stirring, and the insoluble matter was dried. As a result thereof, 126 g of a graft copolymer was obtained (graft rate: 20.6%, weight average molecular weight: 49800 and molecular weight distribution: 1.80).

Example 13

A 500 mL separable flask equipped with a stirring device was charged with 100 g of the reactive polyolefin prepared in Production Example 5 and 67 ml of dehydrated toluene, and the polyolefin was dissolved at 70° C. while stirring. Butyl acrylate 20 g and 3-methacryloxypropyltriethoxysilane 5 g were added thereto, and 20 ml of toluene dissolving 0.4 g of azobisisobutyronitrile was added thereto in 2 hours. After adding, they were reacted at 70° C. for 4 hours. After finishing the reaction, unreacted monomers were removed at 85° C. under reduced pressure. As a result thereof, 124.5 g of a graft copolymer composition was obtained.

$^1$H-NMR analysis of the graft copolymer composition resulted in confirming that 64.5% of a terminal vinylidene group disappeared and that graft copolymerization proceeded. The graft copolymer composition was finely dispersed in acetone to repeat washing and filtering three times at room temperature while stirring, and the insoluble matter was dried. As a result thereof, 123 g of a graft copolymer was obtained (graft rate: 18.7%, weight average molecular weight: 49900 and molecular weight distribution: 1.76).

Comparative Example 1

Reaction and operation were carried out in the same manner as in Example 5, except that vinyl acetate was not used. The results thereof are shown in Table 2.

Comparative Example 2

Reaction and operation were carried out in the same manner as in Example 6, except that 1-decene was not used. The results thereof are shown in Table 2.

Comparative Example 3

Reaction and operation were carried out in the same manner as in Example 1, except that the polypropylene prepared in Production Example 3 was used. The results thereof are shown in Table 2.

TABLE 2

|  | Yield g | Graft rate % | Limiting viscosity (dl/g) | Molecular weight distribution Mw/Mn |
|---|---|---|---|---|
| Example 1 | 2.55 | 21.6 | 0.89 | 2.06 |
| Example 2 | 2.20 | 9.1 | 0.88 | 1.99 |
| Example 3 | 2.40 | 16.7 | 0.90 | 1.91 |
| Example 4 | 2.50 | 20.0 | 0.88 | 1.89 |
| Example 5 | 2.21 | 9.5 | 0.89 | 2.10 |
| Example 6 | 2.27 | 11.9 | 0.86 | 1.86 |
| Example 7 | 2.50 | 20.0 | 0.91 | 2.08 |
| Example 8 | 2.83 | 29.3 | 0.88 | 2.11 |
| Example 9 | 4.50 | 11.1 | 0.84 | 2.03 |
| Example 10 | 2.06 | 2.9 | 0.86 | 2.10 |
| Example 11 | 2.03 | 1.5 | 0.87 | 2.10 |
| Example 12 | 126 | 20.6 | — | 1.80 |
| Example 13 | 123 | 18.7 | — | 1.76 |
| Comparative Example 1 | 2.01 | 0.2 | 0.85 | 2.11 |
| Comparative Example 2 | 2.07 | 0.3 | 0.85 | 2.20 |
| Comparative Example 3 | 2.05 | 0.8 | 0.77 | 2.00 |

Production Example 6

Production of Reactive Polyoctadecene

An autoclave having a content volume of 1.0 liter which was dried by heating was charged with 400 ml of 1-octadecene ($C_{18}$), 1 mmol of triisobutylaluminum and 8 μmol of dimethylaniliniumtetrakis(pentafluorophenyl) borate, and 0.01 MPa of hydrogen was further introduced thereinto. After elevating the temperature up to 150° C. while stirring, 2 μmol of (1,2'-dimethylsilylene)(2,1'-dimethylsilylene)-bis(3-trimethylsilylmethylindenyl)zirconium dichloride obtained in Production Example 1 was added thereto to carry out polymerization for 180 minutes. After finishing the polymerization reaction, the reaction product was dried under reduced pressure by heating to thereby obtain 215 g of a higher olefin polymer.

$^1$H-NMR analysis resulted in finding that the unsaturated terminal was vinylidene and that a concentration thereof was 4.6 mol %. $^{13}$C-NMR analysis resulted in finding that the number of vinylidene per molecule which was determined from an intensity ratio of the vinylidene terminal to the saturated terminal was 0.9. The weight average molecular weight (Mw) reduced to polypropylene which was determined by GPC measurement was 5000, and the molecular weight distribution (Mw/Mn) was 1.5. The melting point (Tm) determined from DSC was 40.7° C. Also, the stereoregularity index ($M_2$) was 55.8 mol %.

Production Example 7

Production of Polyoctadecene

An autoclave having a content volume of 1.4 liter which was dried by heating was charged with 400 ml of 1-octadecene ($C_{18}$), 1 mmol of triisobutylaluminum and 8 μmol of dimethylaniliniumtetrakis(pentafluorophenyl) borate, and 0.2 MPa of hydrogen was further introduced thereinto. After elevating the temperature up to 90° C. while stirring, 2 μmol of (1,2'-dimethylsilylene)(2,1'-dimethylsilylene)-bis(3-trimethylsilylmethylindenyl)zirconium dichloride obtained in Production Example 1 was added thereto to carry out polymerization for 180 minutes. After finishing the polymerization reaction, the reaction product was dried under reduced pressure by heating to thereby obtain 220 g of a higher olefin polymer.

$^1$H-NMR analysis resulted in finding that the unsaturated terminal was vinylidene and that a concentration thereof was 0.2 mol %. $^{13}$C-NMR analysis resulted in finding that the number of vinylidene per molecule which was determined from an intensity ratio of the vinylidene terminal to the saturated terminal was 0.1. The weight average molecular weight (Mw) reduced to polypropylene which was determined by GPC measurement was 35000, and the molecular weight distribution (Mw/Mn) was 1.7. The melting point (Tm) determined from DSC was 42.1° C. Also, the stereoregularity index ($M_2$) was 59.8 mol %.

Example 14

A separable flask of 500 mL equipped with a stirring device was charged with 120 g of the terminal vinylidene-polyoctadecene produced in Production Example 6 described above, 250 ml of toluene, 5 g of maleic anhydride and 5 g of acrylic acid under nitrogen atmosphere to dissolve them at 70° C. Azobisisobutyronitrile 0.6 g as a radical initiator was added thereto to carry out graft copolymerization reaction for 4 hours. After finishing the reaction, reprecipitation was carried out in a large amount of acetone to recover an acetone-insoluble part, whereby 126 g of a graft copolymer was obtained.

The graft rate was calculated setting the acetone-insoluble part to W2 to find that it was 5.0%. A content of maleic anhydride and acrylic acid in the acetone-insoluble part was 4.7% by mass. Also, a density of terminal vinylidene was measured by $^1$H-NMR to find that the density thereof was lowered as compared with that of the terminal vinylidene-polyoctadecene used as the raw material, and therefore it was confirmed that the graft reaction proceeded. Further, a weight average molecular weight (Mw) thereof was 5300, and a molecular weight distribution (Mw/Mn) thereof was 1.55.

Comparative Example 4

A separable flask of 500 mL equipped with a stirring device was charged with 120 g of the polyoctadecene produced in Production Example 7 described above, 250 ml of toluene and 5 g of maleic anhydride under nitrogen atmosphere to dissolve them at 70° C. Azobisisobutyronitrile 0.6 g as a radical initiator was added thereto to carry out graft modification reaction for 4 hours. After finishing the reaction, 117 g of a graft modified matter was obtained in the same manner as in Example 14. A content of maleic anhydride in the acetone-insoluble part was 0.1% by weight.

A graft copolymer was produced by a method shown below, and a thermoplastic resin composition II (cast film) was produced from the above graft copolymer and polyolefin. Further, the above cast film was used to carry out an adhesion evaluation test.
Production of Graft Copolymer Example 15

Production of Maleic Anhydride/Decene-1/Reactive Polypropylene Copolymer Prepared in Production Example 5 Graft Copolymer A 500 mL glass-made separable flask equipped with a stirring device was charged with 100 g of the reactive polypropylene prepared in Production Example 5 and 67 ml of dehydrated toluene, and the polypropylene was dissolved at 70° C. while stirring.

Decene-1 23.0 g and maleic anhydride 15.7 g were added thereto and dissolved. Toluene 30 ml dissolving azobisisobutyronitrile 1 g was added in 3 hours. After adding, they were reacted at the same temperature for 4 hours.

After finishing the reaction, a whole amount of the reaction mixture was transferred into a Teflon-coated bat and dried in air, and then the unreacted monomers and toluene were removed in a vacuum oven of 85° C. for 10 hours. As a result thereof, 124 g of a graft copolymer was obtained.

The graft copolymer was extracted with ethanol dissolving a maleic anhydride/decene-1 copolymer to result in finding that the graft rate was 18.0%. Further, a disappearance rate of the terminal vinylidene group was 55.6%, and it was shown that the graft copolymerization reaction proceeded. A weight average molecular weight (Mw) thereof was 52300, and a molecular weight distribution (Mw/Mn) gg thereof was 1.84.

Example 16

Production of Maleic Anhydride/Vinyl Acetate/Reactive Polypropylene Copolymer Prepared in Production Example 5 Graft Copolymer A graft copolymer was produced in the same manner, except that decene-1 used in Production Example 15 was changed to 14.2 g of vinyl acetate. As a result thereof, 129 g of the graft copolymer was obtained.

Further, a disappearance rate of the terminal vinylidene group was 59.7%, and it was shown that the graft copolymerization reaction proceeded. A weight average molecular weight (Mw) thereof was 49900, and a molecular weight distribution (Mw/Mn) thereof was 1.80.

Example 17

Production of Maleic Anhydride/Acrylic Acid/Reactive Polypropylene Copolymer Prepared in Production Example 5 Graft Copolymer A graft copolymer was produced in the same manner, except that decene-1 used in Production Example 15 was changed to 11.9 g of acrylic acid. As a result thereof, 127 g of the graft copolymer was obtained.

Further, a disappearance rate of the terminal vinylidene group was 94.4%, and it was shown that the graft copolymerization reaction proceeded. A weight average molecular weight (Mw) thereof was 46200, and a molecular weight distribution (Mw/Mn) thereof was 1.85.

Example 18

Production of Maleic Anhydride/Acrylic Acid/Reactive Polypropylene Copolymer Prepared in Production Example 2 Graft Copolymer The same procedure as in Example 17 was carried out, except that the reactive polypropylene prepared in Production Example 17 was changed to a reactive polypropylene (mmmm=43 mole %, terminal vinylidene=98 mole %, weight average molecular weight (Mw)=117000) produced in the same manner as in Production Example 2. As a result thereof, 126 g of a graft copolymer was obtained.

Further, a disappearance rate of the terminal vinylidene group was 92.0%, and it was shown that the graft copolymerization reaction proceeded. A weight average molecular weight (Mw) thereof was 122000, and a molecular weight distribution (Mw/Mn) thereof was 2.10.

Example 19

Production of Acrylic Acid/Reactive Polypropylene Prepared in Production Example 5 Copolymer A 500 mL glass-made separable flask equipped with a stirring device was charged with 100 g of a reactive polypropylene (mmm=55 mole %, terminal vinylidene=96 mole %, weight average molecular weight (Mw)=43600) produced in the same manner as in Production Example 5 and 67 ml of dehydrated toluene, and the polypropylene was dissolved at 80° C. while stirring.

Then, 0.25 g of azobisisobutyronitrile was added thereto. Acrylic acid 16.7 g was dropwise added thereto in 45 minutes. After finishing dropwise adding, they were reacted for one hour. Further, 0.25 g of azobisisobutyronitrile was added, and 16.7 g of acrylic acid was dropwise added thereto again in 45 minutes to carry out reaction for 4 hours. After finishing the reaction, a whole amount of the reaction mixture was transferred into a Teflon-coated bat and dried in air, and then the unreacted monomers and toluene were removed in a vacuum oven of 90° C. for 10 hours. As a result thereof, 133 g of a graft copolymer was obtained.

Dissolution and separation by ethanol were carried out in order to determine a graft rate, and an emulsified matter was prepared, so that it was impossible to carry out completely solid-liquid separation. Accordingly, centrifugal separation (21000 rpm, 30 minutes) was carried out to remove the emulsified matter, and then the solid part was recovered to calculate a graft rate. As a result thereof, the graft rate was 18.1%. Further, a disappearance rate of the terminal vinylidene group was 56.4%, and it was shown that the graft copolymerization reaction proceeded. NMR analysis of the removed emulsified matte resulted in showing that it contained a graft copolymer component since acrylic acid and polypropylene originating in Production Example 2 were present therein. Further, a weight average molecular weight (Mw) thereof was 47800, and a molecular weight distribution (Mw/Mn) thereof was 1.94.

Example 20

Production of Acrylic Acid/Reactive Polypropylene Prepared in Production Example 2 Copolymer A magnetic stirrer was put in a 100 mL three neck flask, and the flask was charged with 2 g of the reactive polypropylene produced in Production Example 2 and 10 ml of dehydrated toluene to dissolve the polypropylene at 70° C. while stirring.

Acrylic acid 2.0 g was added thereto, and 20 mg of azobisisobutyronitrile was further added to react them at the same temperature for 4 hours. After finishing the reaction, 3.98 g of a graft copolymer was obtained in the same manner as in Example 19. In calculating the graft rate, it was difficult to separate the ethanol solution as was the case with Example 19, and an emulsified matter was present in a large quantity. However, the graft rate was determined in the same manner to find that it was 8.5%. Further, a weight average molecular weight (Mw) thereof was 123000, and a molecular weight distribution (Mw/Mn) thereof was 2.10.

Comparative Example 5

Commercial maleic anhydride-modified polypropylene (maleic anhydride content: 4.2% by mass, weight average molecular weight: 20600) was used as a modified matter for a comparative example.

Comparative Example 6

Polypropylene having a low terminal vinylidene concentration was produced by the following method, and a graft copolymer thereof was produced.

A stainless steel-made autoclave having a content volume of 1.4 L which was dried by heating was charged with 0.4 L of dried heptane, 2 ml of a heptane solution of triisobutylaluminum 1.5 mmol and 6 ml of a heptane slurry of dimethylaniliniumtetrakis(pentafluorophenyl) borate 6 μmol, and the mixture was stirred at room temperature for 10 minutes. A heptane slurry 2 ml of (1,2'-dimethylsilylene)(2,1'-dimethylsilylene)-bis(3-trimethylsilylmethylindenyl)zirconium dichloride 1.5 μmol produced in Production Example 2 was added thereto. Next, hydrogen was introduced thereinto up to a pressure of 0.3 MPa in a state in which stirring was terminated. Stirring was initiated, and propylene was introduced thereinto at a partial pressure of 0.5 MPa while controlling at 80° C. A propylene gas was supplied by means of a pressure governor so that a pressure was constant to carry out polymerization for 40 minutes. Then, the reaction liquid was cooled to remove propylene by depressurization, and the content was taken out. The content was dried in air and further dried at 80° C. for 8 hours under reduced pressure to thereby obtain 187 g of polypropylene (terminal vinylidene amount: 0.35 groups/molecule, weight average molecular weight (Mw): 24000, molecular weight distribution: 1.90 and limiting viscosity [η]: 0.24 dl/g).

Operation was carried out in the same manner as in Example 17, except that the reactive polypropylene prepared in Production Example 5 used in Example 17 was changed to the polypropylene described above. As a result thereof, 121 g of a graft copolymer was obtained. The graft copolymer was extracted with acetone to result in finding that a graft rate was 1.7%. Further, a disappearance rate of the terminal vinylidene group was 32%. Also, a weight average molecular weight (Mw) thereof was 24000, and a molecular weight distribution (Mw/Mn) thereof was 1.91.

Production Example 8

Production of Polyolefin

A stainless steel-made autoclave having a content volume of 1.4 L which was dried by heating was charged with 0.4 L of dried heptane, 1 ml of a heptane solution of triisobutylaluminum 1.5 mmol and 2 ml of a heptane slurry of dimethylaniliniumtetrakis(pentafluorophenyl) borate 6 μmol, and the mixture was stirred for 10 minutes while controlling at 50° C. A heptane slurry 2 ml of (1,2'-dimethylsilylene)(2,1'-dimethylsilylene)-bis(3-trimethylsilylmethylindenyl)zirconium dichloride 1.5 μmol produced in Production Example 1 described above was added thereto.

Next, the temperature was elevated up to 70° C. while stirring, and a propylene gas was introduced thereinto up to 0.8 MPa at a full pressure. The propylene gas was supplied by means of a pressure governor so that a pressure was constant during polymerization reaction to carry out polymerization for 47 minutes. Then, the reaction liquid was cooled to remove unreacted propylene by depressurization, and the content was taken out. The content was dried in air and then further dried at 80° C. for 8 hours under reduced pressure to thereby obtain 95 g of polypropylene. A weight average molecular weight thereof was 103000, and a stereoregularity [mmm] thereof was 42.5 mol %.

Production of Thermoplastic Resin Composition II (Cast Film):

The polymers prepared in Examples 15 to 20 or Comparative Examples 5 and 6 and the polyolefin prepared in Production Example 5 or Production Example 8 were used in a whole amount of 5 g, and they were dissolved in 50 ml of toluene, if necessary, by heating. Then, the solvent was removed to prepare cast films (A to P) having a film thickness of 100 μm. The blend proportions are shown in Table 3.

Measurement of Adhesive Strength:

A T peel test was carried out at a tensile rate of 50 mm/minute. An autograph (DSC-200) manufactured by Shimadzu Corporation was used for the measurement to determine the peel adhesive strength from the maximum stress. An average of the measured values of the three test pieces was used for the measured value. The results thereof are shown in Table 3.

TABLE 3

| | | | Thermoplastic resin composition II | | | | | | | | | | | | | | | |
|---|---|---|---|---|---|---|---|---|---|---|---|---|---|---|---|---|---|---|
| | | | A | B | C | D | E | F | G | H | I | J | K | L | M | N | O | P |
| Composition (mass part) | Copolymer | Example 15 | — | — | — | — | — | — | — | 1 | — | — | — | — | — | — | — | — |
| | | Example 16 | — | — | — | — | — | 1 | — | — | — | — | — | — | — | — | — | — |
| | | Example 17 | 1 | 1 | — | — | — | — | — | — | 1 | — | 1 | — | — | — | — | — |
| | | Example 18 | — | — | — | — | — | — | — | — | — | — | — | 1 | — | — | — | — |
| | | Example 19 | — | — | — | — | — | — | — | — | — | — | — | — | 1 | — | — | — |
| | | Example 20 | — | — | — | — | — | — | — | — | — | — | — | — | — | 1 | — | — |
| | | Comparative Example 5 | — | — | 1 | 1 | 1 | — | 1 | — | — | 1 | — | — | — | — | 1 | — |
| | | Comparative Example 6 | — | — | — | — | — | — | — | — | — | — | — | — | — | — | — | 1 |
| | Polyolefin | Production Example 5 | — | — | — | — | — | — | — | — | — | — | 56.5 | — | — | — | — | — |
| | | Production Example 8 | 56.5 | 213 | 41 | 199 | 72.7 | 18.9 | 19 | 9 | 9 | 9 | — | 199 | 0.5 | 0.5 | 0.5 | 213 |
| Content (mass %) of maleic anhydride | | | 0.21 | 0.06 | 0.1 | 0.02 | 0.06 | 0.59 | 0.21 | 0.78 | 1.2 | 0.42 | 0.21 | 0.06 | — | — | 2.8 | 0.05 |
| Adhesive strength (N/25 mm) | PP/PP | | 41.9 | 46.3 | 17.3 | 2.5 | 8.8 | 30.4 | 25.4 | — | — | — | 35.2 | 45.0 | — | — | — | 17 |
| | PP/PVA | | — | — | — | — | — | — | — | 52.0 | 87.3 | 25.6 | — | — | — | — | — | — |
| | PP/glass | | — | — | — | — | — | — | — | — | — | — | — | — | 85 | 98 | 20 | — |

Adhesion Evaluation Test:

Adhesion Base Material:

Polypropylene (PP): polypropylene (product name: SUPER-PURELAY SG-140TC, thickness: 0.3 mm) manufactured by Idemitsu Unitech Co., Ltd. was used.

Polyvinyl alcohol (PVA): partial saponification type polyvinyl alcohol (PVA) (average polymerization degree=about 3100 to 3900, saponification degree=86 to 90 mol %) manufactured by Hiroshima Wako Co., Ltd. was used, and a 10% aqueous solution thereof was poured into a Teflon-coated bat and dried in air while maintaining the bat parallel to prepare a sheet having a thickness of 200 μm. It was further dried at 80° C. for 48 hours under nitrogen flow.

Glass: slide glass (length: 7.6 cm, width: 2.6 cm, thickness: 0.14 to 0.15 cm) manufactured by AS ONE Corporation was used.

Preparation of Test Piece:

An adhesion base material was cut into a width of 25 mm and a length of 100 mm, and an adhesive layer obtained by cutting the cast film described above into 25 mm×25 mm was interposed between the above adhesion base materials and pre-heated at 130° C. for 20 seconds by means of a hot press, and then they were fused at a pressure of 0.5 MPa for 40 seconds. This was interposed lightly between cooling rolls and cooled down to room temperature. The test piece thus prepared was left standing at room temperature for a week and then subjected to measurement of an adhesive strength.

INDUSTRIAL APPLICABILITY

The graft copolymer or the thermoplastic resin composition containing the above graft copolymer according to the present invention is useful as a sealant having a high adhesive property with plastic materials, papers, woods and the like, as a modifier for polyolefins, for example, a modifier for obtaining polyolefins which are improved in a compatibility characteristic with inorganic fillers, dyes, polar polymers, polar waxes, wood powders, metals and the like, a mechanical property and a fluidity and as a surface treating agent for polyolefins, a primer treating agent, a coating agent component and the like.

What is claimed is:

1. A graft copolymer having a structure in which an unsaturated group of a chain terminal and/or a principal chain pendant in a reactive polyolefin having 0.5 or more terminal unsaturated groups per molecule and comprising at least one monomer selected from α-olefins having 2 to 28 carbon atoms is introduced into a copolymerized chain derived from at least one monomer selected from the following group A and at least one monomer selected from the following group B and satisfying the following conditions (a) to (c):

group A: [V] maleic anhydride and substitution products thereof, [VI] maleic anhydride and esters thereof and [VII] maleimide and substitution products thereof and group B: [I] acrylic acid and derivatives thereof, [II] methacrylic acid and derivatives thereof, [III] vinyl esters and derivatives thereof, [IV] styrene and derivatives thereof and [VIII] α-olefins, (a) a graft rate is 1.5 to 150% by mass,
(b) a limiting viscosity [η] which is measured in decalin at 135° C. is 0.01 to 2.5 dl/g and
(c) a molecular weight distribution (Mw/Mn) is 1.8 to 6.

2. A graft copolymer having a structure in which an unsaturated group of a chain terminal and/or a principal chain pendant in a reactive polyolefin having 0.5 or more terminal unsaturated groups per molecule and comprising at least one monomer selected from α-olefins having 2 to 28 carbon atoms is introduced into a copolymerized chain derived from at least one monomer selected from the following group A and at least one monomer selected from the following group B and satisfying the following conditions (a) to (c):

group A: [V] maleic anhydride and substitution products thereof, [VI] maleic anhydride and esters thereof and [VII] maleimide and substitution products thereof and group B: [I] acrylic acid and derivatives thereof, [II] methacrylic acid and derivatives thereof, [III] vinyl esters and derivatives thereof, [IV] styrene and derivatives thereof and [VIII] α-olefins, (a) a graft rate is 1.5 to 150% by mass,
(b) a limiting viscosity [η] which is measured in decalin at 135° C. is 0.01 to 2.5dl/g and
(c) a molecular weight distribution (Mw/Mn) is 1.5 to 4.

3. The graft copolymer according to claim 1, wherein the reactive polyolefin chain is a propylene base polymer of 90 to 100% by mass of propylene with 0 to 10% by mass of at least one monomer selected from ethylene, α-olefins having 4 to 28 carbon atoms, polyenes and cyclic olefins or an ethylene base polymer of 70 to 100% by mass of ethylene with 0 to 30% by mass of at least one monomer selected from α-olefins having 3 to 28 carbon atoms, polyenes and cyclic olefins.

4. The graft copolymer according to claim 1, wherein it is the propylene base polymer in which a mesopentad ratio [mmmm] of the reactive polyolefin falls in a range of 20 to 99 mole %.

5. The graft copolymer according to claim 1, wherein the monomer of the group A is [V] maleic anhydride and the substitution products thereof.

6. The graft copolymer according to claim 1, wherein a sea-island structure is present in a molded matter produced by heating, melting, cooling and solidifying, and the molded matter contains an island part having a particle diameter of 10 to 100 nm.

7. A thermoplastic resin composition comprising the graft copolymer according to claim 1 and polyolefin.

8. A thermoplastic resin composition comprising the graft copolymer according to claim 1, polyolefin and an inorganic filler and/or a pigment.

9. A thermoplastic resin composition comprising the graft copolymer according to claim 1, polyolefin, a thermoplastic resin and an inorganic filler and/or a pigment.

10. The graft copolymer according to claim 1, wherein the monomer of group B is [I] acrylic acid and derivatives thereof, [II] methacrylic acid and derivatives thereof, [III] vinyl esters and derivatives thereof, or [VIII] α-olefins.

11. The graft copolymer according to claim 1, wherein the graft rate of the graft copolymer is 5 to 100% by mass.

* * * * *